(12) United States Patent
Vander Wel et al.

(10) Patent No.: US 8,545,201 B2
(45) Date of Patent: Oct. 1, 2013

(54) CURING SYSTEM USING ELECTROMAGNETIC FORCE

(75) Inventors: Michael M. Vander Wel, Lynnwood, WA (US); Alexander M. Rubin, St. Louis, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/587,885

(22) Filed: Aug. 16, 2012

(65) Prior Publication Data

US 2012/0305197 A1 Dec. 6, 2012

Related U.S. Application Data

(62) Division of application No. 12/498,733, filed on Jul. 7, 2009, now Pat. No. 8,268,226.

(51) Int. Cl.
*B29C 35/12* (2006.01)

(52) U.S. Cl.
USPC ......... 425/3; 264/486; 264/296; 425/DIG. 33

(58) Field of Classification Search
USPC ............... 264/480, 257, 486, 296; 425/3, 425/DIG. 33
See application file for complete search history.

(56) References Cited

U.S. PATENT DOCUMENTS

| | | | |
|---|---|---|---|
| 5,338,497 A * | 8/1994 | Murray et al. ............. | 264/486 |
| 5,340,428 A | 8/1994 | Kokokian | |
| 5,645,744 A | 7/1997 | Matsen | |
| 5,723,849 A | 3/1998 | Matsen | |
| 5,728,309 A | 3/1998 | Matsen | |
| 5,808,281 A | 9/1998 | Matsen | |
| 5,827,392 A | 10/1998 | Buckley et al. | |
| 6,528,771 B1 | 3/2003 | Matsen | |
| 6,914,225 B2 | 7/2005 | Fischer | |
| 7,148,776 B2 | 12/2006 | Day et al. | |
| 7,744,358 B2 * | 6/2010 | Kasono ............. | 425/3 |
| 7,887,739 B2 | 2/2011 | Chou | |
| 8,268,226 B2 * | 9/2012 | Vander Wel et al. ....... | 264/486 |
| 2007/0175571 A1 | 8/2007 | Rubin et al. | |
| 2009/0174118 A1 * | 7/2009 | Maeda et al. ............. | 264/323 |

FOREIGN PATENT DOCUMENTS

| | | | | |
|---|---|---|---|---|
| JP | 2006205207 A * | 8/2006 | ............. | B30B 1/42 |
| WO | WO2005097470 A1 * | 10/2005 | ............. | B29C 59/02 |
| WO | WO2006132119 A1 * | 12/2006 | ............. | B29C 59/02 |

OTHER PUBLICATIONS

S. H. Le G. Bisson et al. "Finite Element Analysis of Transient Electromagnetic Heating Effects in Three Dimensions," IEEE Transactions on Magnetics, Vol. 29, No. 1, Jan. 1993, pp. 1102-1106.

Tecnomagnete, Inc., "Permanent electromagnetic system for quick clamping of high temperature moulds," description of HotMag Quad Press.

\* cited by examiner

*Primary Examiner* — Seyed Masoud Malekzadeh
*Assistant Examiner* — Nahida Sultana

(57) ABSTRACT

A system for forming a composite structure comprises an electromagnetic press including an upper die, a lower die and an electromagnet. The lower die may be mounted in spaced relation to the upper die for receiving a composite layup therebetween. The electromagnet is energizable such that the upper and lower dies apply a compressive force to the composite layup.

15 Claims, 19 Drawing Sheets

CURING SYSTEM USING ELECTROMAGNETIC FORCE

CROSS-REFERENCE TO RELATED APPLICATIONS

The present application is a divisional application of and claims priority to pending U.S. application Ser. No. 12/498,733 filed on Jul. 7, 2009 and entitled CURING SYSTEM AND METHOD USING ELECTROMAGNETIC FORCE AND CONDUCTIVE HEAT TRANSFER, the entire contents of which is expressly incorporated by reference herein.

FIELD

The present disclosure relates generally to the production of composite parts and, more particularly, to an electromagnetic press for fabricating composite structures.

BACKGROUND

Composite structures are used in a wide variety of applications. For example, in aircraft construction, composites are used in increasing quantities to form the fuselage, wings, tail section and other aircraft components. The fabrication of composite parts generally entails laying up composite material on a tool or die and curing the composite material at elevated temperatures and pressures to form a rigid composite structure. Unfortunately, conventional practices for laying up and curing the composite material typically include numerous additional steps in order to produce a final composite structure having the desired mechanical properties.

For example, prior to or during curing of the composite layup, it may be necessary to compress or debulk and/or consolidate the composite layup in order to prevent the occurrence of voids in the cured composite structure and to reduce the thickness of the composite layup such that the cured composite structure meets dimensional design requirements. The reduced thickness of the composite layup as a result of consolidation may also be necessary to achieve the desired fiber volume fraction of the cured composite structure. In this regard, consolidation may reduce the overall volume and/or weight of the resin in the composite structure relative to the volume or weight of the load-carrying fibers that make up the composite material.

In one prior art curing or consolidating method, the composite layup may be vacuum bagged or sealed to the tool. A vacuum may be applied to the vacuum bag in order to promote the dispersion of uncured resin throughout the composite layup and to draw out air and volatiles (i.e., curing byproducts) from the composite layup that may otherwise become trapped in the composite layup during curing.

In order to generate a sufficient amount of external pressure on the composite layup, conventional practices include vacuum bagging of the composite layup assembly and transferring the composite layup to an autoclave. The pressure and temperature within the autoclave are then increased until the composite layup reaches the curing pressure and temperature. The composite layup must typically be held at the curing temperature for a predetermined period of time while external pressure is applied to an exterior of the vacuum bag and vacuum pressure is applied to an interior of the vacuum bag. The curing cycle may further require a stepwise or gradual increase and/or reduction in the temperature of the composite layup while external pressure and vacuum pressure is maintained.

Following curing, the pressure and temperature of the cured composite structure must be reduced to allow for removal of the bagged composite layup assembly from the autoclave followed by removal of the cured composite structure from the vacuum bag and tool. As may be appreciated, autoclaves of sufficiently large size for handling correspondingly large composite layups represent a significant capital equipment expenditure which adds to the overall cost and complexity of fabricating a composite structure. Furthermore, the amount of time required to prepare a composite layup for autoclave operations and to complete a curing or consolidating process using the autoclave represents a significant portion of the total fabrication cycle time for a composite structure. In this regard, because autoclaves typically rely on convective heating to elevate the temperature of the composite layup, the relatively large thermal mass of the tool as compared to the thermal mass of the composite layup results in an extended period of time for reaching the curing temperature and then cooling the composite layup and tool.

Attempts at reducing reliance on autoclaves to provide the requisite consolidation temperatures and pressures include the use of hydraulic presses. Although generally satisfactory for forming composite structures of relatively small size, hydraulic presses may be limited in the amount of pressure that can be developed. As a result, the use of hydraulic presses for consolidating and curing large composite layups is limited. Furthermore, curing cycles for certain composite layups may require the application of precise levels of temperature and pressure which may be unachievable using conventional hydraulic presses. In addition, hydraulic presses may present cleanliness and maintenance challenges in consideration of the use of hydraulic oil as the working fluid and the various components such as accumulators, pumps, sealing mechanisms and other hardware typically associated with hydraulic presses.

As can be seen, there exists a need in the art for a system and method for curing a composite layup that eliminates the need for an autoclave. In this regard, there exists a need in the art for a system and method for curing a composite layup that can rapidly achieve the requisite temperatures and pressures required for curing. In addition, there exists a need in the art for a system and method for curing a composite layup that allows for application of the curing pressures required to form composite layups of relatively large size. Finally, there exists a need in the art for a low-cost system and method for curing composite layups that can be performed in a reduced amount of time.

SUMMARY

The above-noted needs associated with the application of curing pressure and temperature to a composite layup are specifically addressed by the embodiments disclosed herein comprising a system and method for fabricating a composite structure using an electromagnetic press.

In an embodiment, the system may comprise an electromagnetic press having an upper die and a lower die mounted in spaced relation to the upper die for receiving a composite layup. The electromagnetic press may include at least one electromagnet which may be coupled to one of the upper and lower dies. The electromagnet may be energizable such that the upper and lower dies may apply a compressive force to the composite layup. The electromagnetic press may further include a heating mechanism that may be mountable to at least one of the upper and lower dies and which may be configured to apply heat to the composite layup such as by conductively heating the upper and lower dies.

Also disclosed is a system that may comprise an embodiment of the electromagnetic press for forming the composite structure from the composite layup wherein the electromagnetic press includes the upper die, the lower die mounted in spaced relation to the upper die for receiving the composite layup, and wherein the upper and lower dies are movable into contacting relation with the composite layup. The electromagnetic press may include the electromagnet having a magnetic coil. The electromagnet may be coupled to one of the upper and lower dies and may be energizable by applying an electric current to the magnetic coil such that the upper and lower dies are drawn together to apply a compressive force to the composite layup. The system may further comprise a heating mechanism configured to apply heat to the composite layup. In an embodiment, the heating mechanism may comprise the magnetic coil and a conductive frame at least partially surrounding the magnetic coil. The conductive frame may be coupled to one of the upper and lower dies and configured such that energization of the magnetic coil causes inductive heating of one of the upper and lower dies for conductively heating the composite layup.

In a further embodiment, disclosed is a system for forming a composite structure having an electromagnetic press that may include upper and lower dies and first and second electromagnetic mechanisms. The upper die may have the first electromagnetic mechanism coupled thereto wherein the first electromagnetic mechanism is movable. The lower die may be mounted in spaced relation to the upper die. The second electromagnetic mechanism may be fixedly mounted on a side of the first electromagnetic mechanism opposite the lower die. In addition, the second electromagnetic mechanism may be energizable to generate an attractive force relative to the first electromagnetic mechanism such that a composite layup is receivable between the upper and lower dies. The second electromagnetic mechanism may also be configured with reversible polarity such that a repulsive force may be generated relative to the first electromagnetic mechanism. The first electromagnetic mechanism may be energizable to cause the upper and lower dies to apply a compressive force to the composite layup.

In a further embodiment, the system for forming a composite structure may comprise an electromagnetic press including an upper die, a lower die and first and second electromagnetic mechanisms. The upper die may have a first electromagnet mechanism coupled thereto wherein the first electromagnet mechanism is movable. The lower die may be mounted in spaced relation to the upper die. The lower die may be coupled to the second electromagnetic mechanism. The second electromagnetic mechanism may be energizable to generate a repulsive force relative to the first electromagnetic mechanism such that a composite layup is receivable between the first and second dies. The second electromagnetic mechanism may further be de-energizable when the first electromagnetic mechanism is energized to cause the first electromagnetic mechanism to generate an attractive force relative to the second electromagnetic mechanism such that the upper and lower dies may apply a compressive force to the composite layup.

The present disclosure further includes a system for fabricating a composite structure wherein the system comprises an electromagnetic press including an inner die and an outer die mountable in spaced relation to the inner die for receiving a composite layup. The system may include an electromagnet coupled to one of the inner and outer dies. The electromagnet may be energizable such that the inner and outer dies apply a compressive force to the composite layup. The electromagnetic press may be configured to be movable along a length of the composite layup to incrementally form the composite structure.

In an embodiment, the electromagnetic press may be used in a method of fabricating a composite structure from a composite layup. The composite layup may include fiber-reinforced material and uncured resin. The method may comprise consolidating the fiber-reinforced material in the composite layup. The method may further comprise compressing the composite layup electromagnetically during the consolidation of the fiber-reinforced material.

Also disclosed is a method of forming a plurality of consolidation zones in a composite layup at spaced locations along the length of the composite layup. The method may use an electromagnetic press having upper and lower dies and an electromagnet coupled to one of the upper and lower dies. The electromagnet may include a conductive frame at least partially surrounding a magnetic coil. The electromagnet may be coupled to the upper die. The method may comprise the steps of pre-heating the upper and lower dies in anticipation of receiving the composite layup. The method may further include inserting a portion of the length of the composite layup into a spacing between the upper and lower dies. A release film may be provided between the composite layup and at least one of the upper and lower dies to facilitate separation of the composite layup from the upper and lower dies.

The method may comprise moving the upper and lower dies into contacting relation with the composite layup followed by energizing the electromagnet such that the upper and lower dies apply a compressive force to the composite layup to form one of the consolidation zones in the composite layup. The method may further comprise applying inductively heating the conductive frame and the upper die when energizing the electromagnet. In this manner, the inductively heated upper die may conductively heat the composite layup to conductively heat the composite layup. The upper and lower dies may be separated and the length of the composite layup may be advanced along a material feed direction through the electromagnetic press such that another one of the consolidation zones may be formed along a length of the composite layup.

Further disclosed is a method of fabricating a composite structure from a composite layup using an electromagnetic press. The composite layup may include upper and lower dies and first and second electromagnetic mechanisms. The upper die may be coupled to the first electromagnetic mechanism. The second electromagnetic mechanism may be mounted on a side of the first electromagnetic mechanism opposite the lower die and may have reversible polarity. The method may comprise the step of energizing the second electromagnetic mechanism to generate an attractive force between the first and second electromagnetic mechanisms such that a spacing is generated between the upper and lower dies. The composite layup may be inserted into the spacing. Polarity of the second electromagnetic mechanism may be reversed to generate a repulsive force between the first and second electromagnetic mechanisms. The method may further comprise the step of moving the upper and lower dies into contacting relation with the composite layup. The first electromagnetic mechanism may be energized such that the upper and lower dies apply a compressive force to the composite layup.

The present disclosure further includes a method of fabricating a composite structure from a composite layup using an electromagnetic press including upper and lower dies respectively coupled to first and second electromagnetic mechanisms. The method may comprise the steps of energizing the second electromagnetic mechanism to generate a repulsive force relative to the first electromagnetic mechanism such that a spacing is generated between the upper and lower dies. The method may further include inserting the composite layup into the spacing. The second electromagnetic mechanism may then be de-energized and the first electromagnetic mechanism may then be energized to generate an attractive force between the first and second electromagnetic mechanisms. The method may further comprise moving the upper and lower dies into contacting relation with the composite layup and applying a compressive force to the composite layup.

In a method of fabricating a composite structure from a composite layup, an electromagnetic press may be used wherein the electromagnetic press may have an electromagnet and inner and outer dies formed complementary to the composite layup. One of the inner and outer dies may be coupled to the electromagnet. The method may include engaging the electromagnetic press to the composite layup such that the inner and outer dies are positioned on opposing sides of the composite layup. The inner and outer dies may be moved into contacting relation with the composite layup. The electromagnet may be energized such that the inner and outer dies apply a compressive force to the composite layup. The electromagnetic press may be advanced along a length of the composite layup to incrementally form the composite structure.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
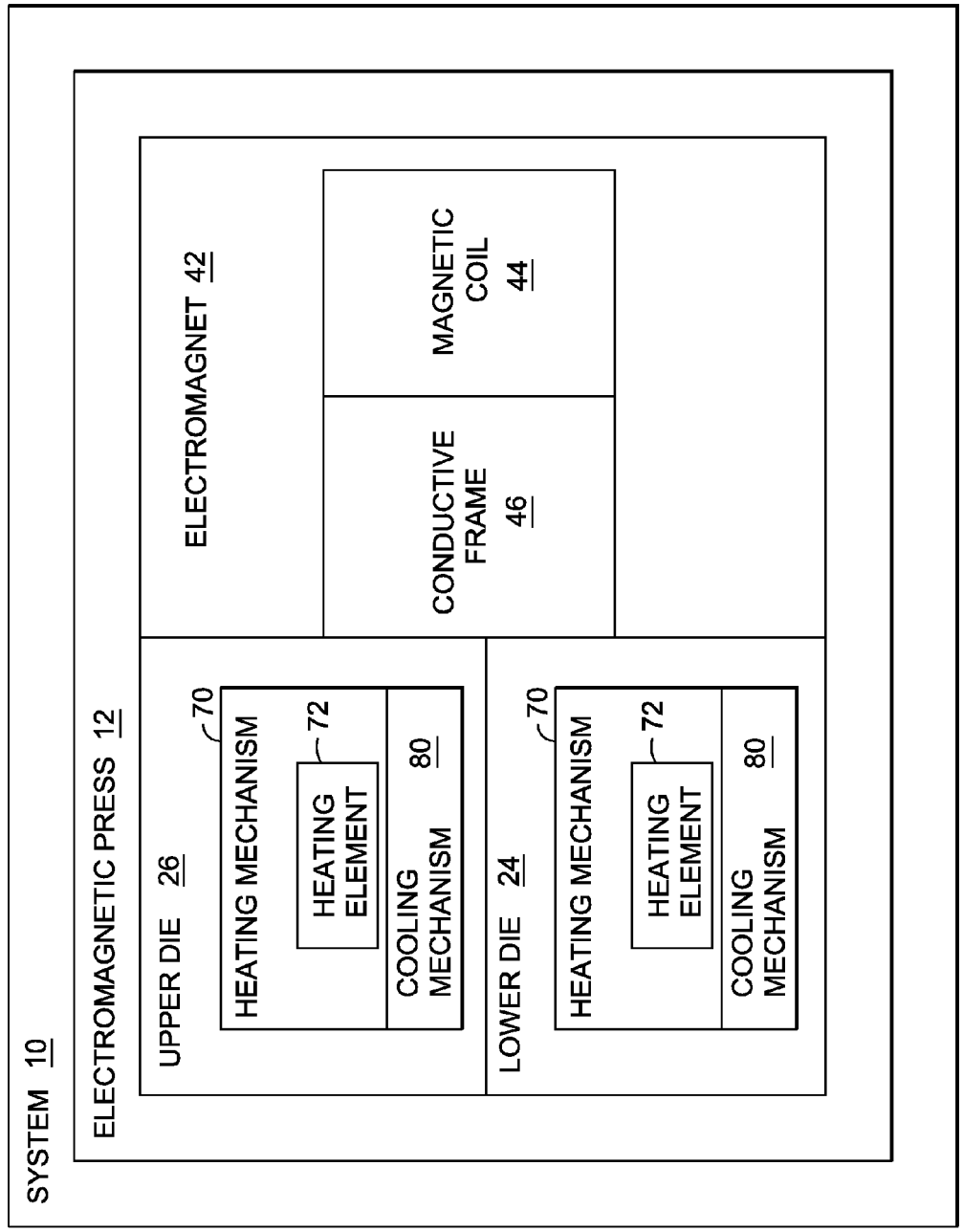
FIG. 1 is an illustration of a functional block diagram of a system for forming a composite structure wherein the system may comprise an electromagnetic press having upper and lower dies and at least one electromagnet.
Figure 2:
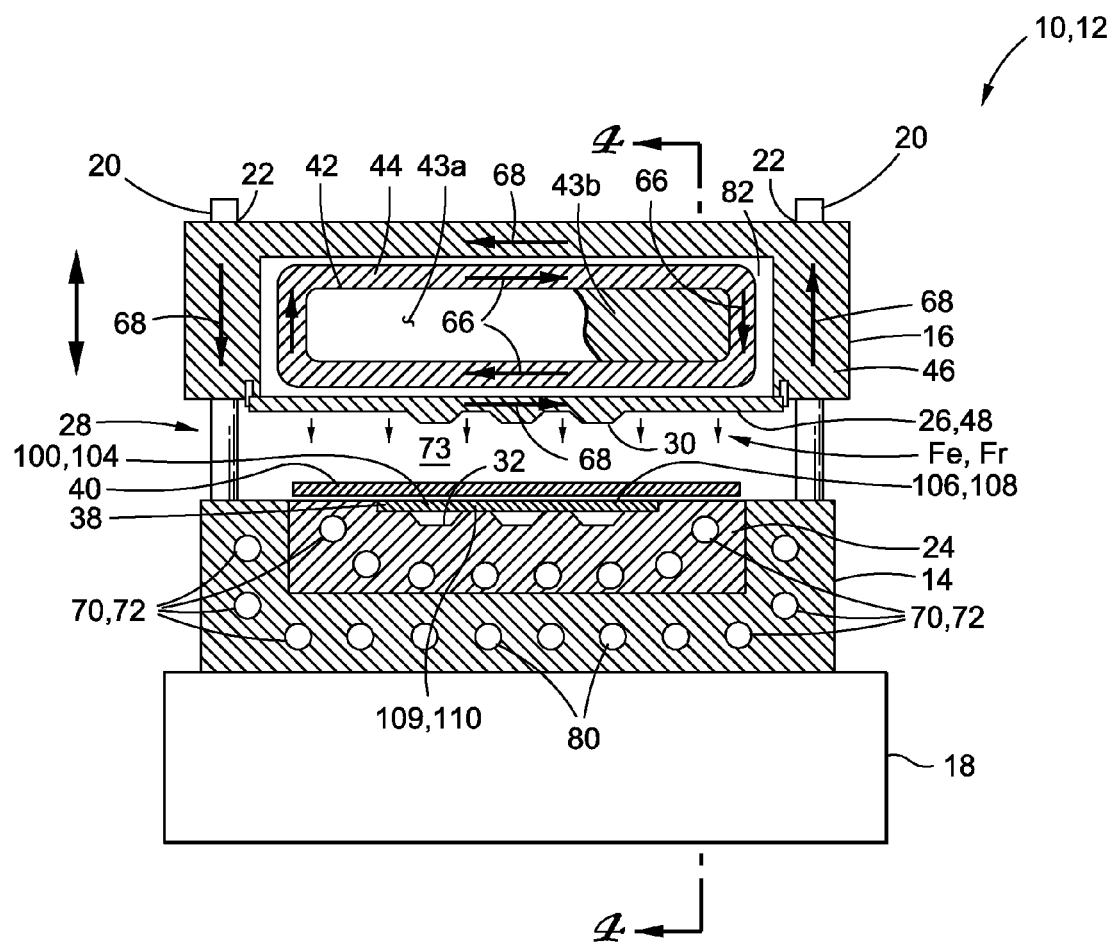
FIG. 2 is a front view of the electromagnetic press illustrating the upper and lower dies disposed in spaced relation to one another for receiving a composite layup prior to forming into the composite structure and further illustrating the composite layup having a release film disposed thereon.

Referring now to the drawings wherein the showings are for purposes of illustrating preferred and various embodiments of the disclosure only and not for purposes of limiting the same, shown in FIG. 1 is a system 10 for forming a composite structure 104 as shown in FIG. 2 from a composite layup 106 as is also shown in FIG. 2. The composite layup 106 may be formed of fiber-reinforced material 109 and uncured resin 110 as shown in FIG. 2 although any material may be used. The system 10 shown in FIG. 1 may comprise an electromagnetic press 12 having upper and lower dies 26, 24 and at least one electromagnet 42. The electromagnet 42 may be coupled to at least one of the upper and lower dies 26, 24. Optionally, one of the upper and lower dies 26, 24 may be configured as a pressure membrane 48 disposed on a side of the composite layup 106 opposite the remaining one of the upper and lower dies as illustrated in FIG. 2. The upper and lower dies 26, 24 may be mounted in spaced relation to one another for receiving the composite layup 106 as shown in FIG. 2. The upper and lower dies 26, 24 may be movable into contacting relation with the composite layup 106.

When the upper and lower dies 26, 24 are in contact with the composite layup 106, the electromagnet 42 may be energized by applying or transmitting electric current to one or more magnetic coils 44 of the electromagnet 42. As a result of energization of the magnetic coil 44, the upper die 26 may apply pressure to the lower die 24 under a repulsive force Fr urging the upper die 26 downwardly relative to the electromagnet 42 as shown in FIG. 2 such that a compressive force may be applied to the composite layup 106 for consolidating and/or curing the composite layup 106. Advantageously, the electromagnetic press 12 facilitates accurate control of the magnitude of the compressive force that is applied to the composite layup 106 by controlling the amount of electrical current that may be applied to the magnetic coil 44. In this manner, variations in the magnitude of the compressive force may be accurately controlled.

Referring to FIG. 1, the electromagnetic press 12 may include a heating mechanism 70 for applying heat to the upper and/or lower dies 26, 24 for conductively heating the composite layup 106. The application of heat to the composite layup 106 may be desirable in order to promote or facilitate curing or consolidation of the composite layup 106. In an embodiment, the heating mechanism 70 may be mountable to the upper die 26 and/or lower die 24 or other components of the electromagnetic press 12 such that heat may be conductively applied to the composite layup 106. However, the heating mechanism 70 may apply heat to the composite layup 106 using any suitable heat transfer means or combinations thereof including, without limitation, induction, conduction, convection and/or radiation heat transfer.

The application of heat to the composite layup 106 may facilitate a reduction in the viscosity of uncured resin 110 in the composite layup 106 as shown in FIG. 2. In addition, the application of heat to the composite layup 106 may promote consolidation of the fiber-reinforced material 109 of the composite layup 106 and promote curing of the uncured resin 110. Toward this end, the heating mechanism 70 may comprise one or more heating elements 72 that may be integrated into or mounted to the upper die 26 and/or lower die 24 as shown in FIG. 1.

For example, the heating mechanism 70 may be configured as one or more electrical heating elements 72 that may extend at least partially through at least a portion of the upper die 26 and/or the lower die 24. However, the heating mechanism 70 may be formed in a variety of different configurations. For example, the heating mechanism 70 may be formed as a plurality of conduits (not shown) for circulating heating fluid such as heated oil. Furthermore, installation of the heating mechanism 70 is not limited to mounting to or integration with the upper die 26 and/or lower die 24 but may comprise integration or mounting of the heating mechanism 70 in any suitable component of the electromagnetic press 12 including, but not limited to, integration or mounting in the stationary tool 14 and/or the movable tool 16.

With regard to configurations of the heating mechanism 70, the electromagnet 42 may include a conductive frame 46 as shown in FIG. 1 and which may at least partially surround the magnetic coil 44. As indicated above, the electromagnetic press 12 may be configured such that the upper die 26 or the lower die 24 may be coupled to the conductive frame 46. Energization of the magnetic coil 44 by the application of electrical current may cause inductive heating of the conductive frame 46 and the upper die 26 or the lower die 24 depending upon which one of the upper and lower dies 26, 24 is coupled to the conductive frame 46.

For example, as shown in FIG. 2, the upper die 26 may be coupled to the conductive frame 46. The inductive heating of the conductive frame 46 and upper die 26 may occur upon energization of the magnetic coil 44 as is known in the art. The application of electrical current to the magnetic coil 44 and the resulting coil current flow 66 through the magnetic coil 44 may generate an inductive current flow 68 through the conductive frame 46 and upper die 26 in a direction opposite the direction of the coil current flow 66. Inductive heating of the conductive frame 46 and the upper die 26 may result due to eddy currents (not shown) in the conductive frame 46 and upper die 26.

Advantageously, inductive heating of the upper or lower dies 26, 24 may occur relatively rapidly as compared to heating by conventional means such as by convective heating. As a result, the composite layup 106 in contact with the upper die 26 may also be relatively rapidly heated by conductive transfer of heat from the upper die 26. Heating of the composite layup 106 from the lower die 24 may be facilitated by the above-mentioned heating elements 72 that may extend through the lower die 24 and/or stationary tool 14 or which may be mounted on the lower die 24 and/or stationary tool 14. However, heating may be effectuated through non-conductive means such as by radiative or convective means or by combinations thereof.

Referring to FIG. 1, the electromagnetic press 12 may include at least one cooling mechanism 80 which may be mounted to the electromagnetic press 12 for cooling at least one of the upper and lower dies 26, 24. By optionally incorporating a cooling mechanism 80 into the electromagnetic press 12, the composite layup 106 may be actively cooled in a rapid manner as compared to the amount of time required for passive cooling using conventional equipment.

Referring to FIG. 2, shown is an embodiment of the electromagnetic press 12 as briefly mentioned above. The electromagnetic press 12 may be used for forming a composite structure 104 and may include a stationary tool 14 mounted below a movable tool 16. The stationary tool 14 may be mounted on or supported by a suitable support structure 18. The movable tool 16 may be moved relative to the stationary tool 14 by any suitable means to form a spacing 28 therebetween for insertion of a workpiece 100 such as the composite layup 106 and to facilitate removal of the composite layup 106 or cured composite structure 104 from the electromagnetic press 12. The movable tool 16 may be movably mounted or supported on a set of shafts 20 extending upwardly from the stationary tool 14 as illustrated in FIG. 2. One or more actuation mechanisms 22 may be incorporated into the electromagnetic press 12 to facilitate movement of the movable tool 16 relative to the stationary tool 14. The shafts 20 may be configured to maintain alignment of the movable tool 16 with the stationary tool 14. The actuation mechanism 22 may be configured in any suitable arrangement for moving the moveable tool relative to the stationary tool 14. For example, the actuation mechanism 22 may include any drive mechanism configuration including, without limitation, any suitable mechanical, electro-mechanical, hydraulic or pneumatic mechanism or any combination thereof for effecting relative movement.

Figure 3:
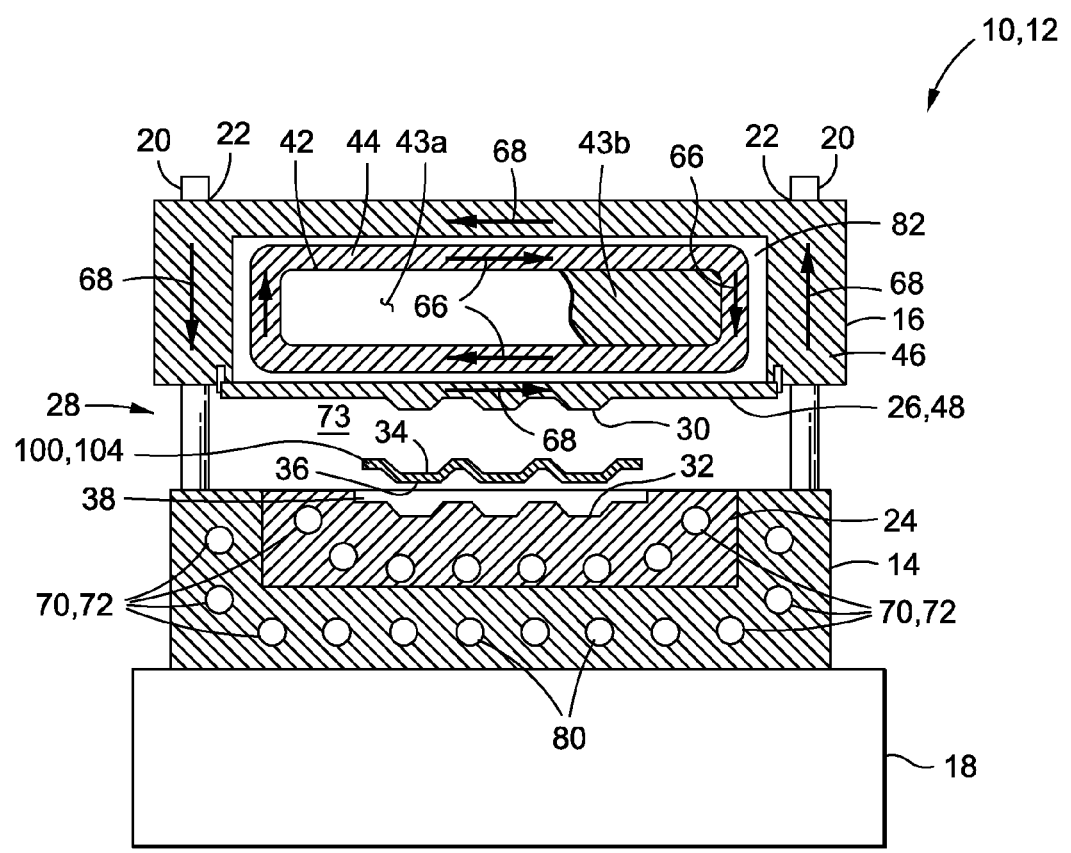
FIG. 3 is a front view of the electromagnetic press illustrating the composite structure assuming the shape of the upper and lower dies following forming of the composite layup.

As can be seen in FIG. 2, the upper die 26 may be coupled to the movable tool 16 and may include an upper mold surface 30 that is placed into contact with the composite layup 106 to transfer the contour or shape of the upper mold surface 30 into the composite layup 106 during the curing process. In this regard, the upper die 26 may be configured to be removably coupled to the movable tool 16 to facilitate substitution of alternative upper die 26 configurations having upper mold surfaces 30 of differing contours. In an embodiment, the upper die 26 may be provided with a configuration or contour of the upper mold surface 30 that is complementary to a configuration or contour of the lower mold surface 32 of the lower die 24. The upper and lower dies 26, 24 may optionally be formed as a generally rigid structure for producing a controlled contour on opposite sides of the composite structure 104 as illustrated in FIG. 3.

Optionally, the upper die 26 may be configured as the pressure membrane 48 that may be coupled to the movable tool 16 as shown in FIG. 2. Alternatively, the lower die 24 may be configured as the pressure membrane 48. The pressure membrane 48 may be adapted for producing configurations of the composite structure 104 where precise control of the contour on one of the opposing sides of the composite structure 104 may not be required. In embodiments where the lower die 24 is configured as the pressure membrane 48, the upper die 26 may be positioned opposite the lower die 24/pressure membrane 48. The lower mold surface 32, upper mold surface 30 and/or pressure membrane 48 may optionally include a release film 40 as shown in FIG. 2. The release film 40 may facilitate separation of the composite layup 106 from the lower mold surface 32, upper mold surface 30 and/or pressure membrane 48 such as after curing of the composite layup 106.

Referring still to FIG. 2, the upper die 26 may be mounted to the conductive frame 46 as shown in FIG. 2. The conductive frame 46 may at least partially surround the magnetic coil 44. The magnetic coil 44 may be electrically separated or insulated from the conductive frame 46 by a gap 82 or by a suitable electrically-insulating material or by using any other suitable electrically-insulating mounting configuration. The magnetic coil 44 may include an air core 43*a* or a magnetic core 43*b* of any suitable geometry and formed of any suitable material.

The lower die 24 may be integrated into or mounted upon the stationary tool 14. In this regard, the lower die 24 may be configured to be removably coupled to the stationary tool 14 to facilitate substitution of alternative lower die 24 configurations. In the embodiment illustrated in FIG. 2, the lower die 24 may include a lower mold surface 32 that may be configured complementary to the upper mold surface 30 of the upper die 26. In this regard, the upper and lower dies 26, 24 may form a matched die set as may be used for accurate control of the outer mold surfaces of the cured composite structure 104. As can be seen in FIGS. 2-3, the lower die 24 may include a recess 38 that is sized and configured complementary to the upper mold surface 30 of the upper die 26. The composite layup 106 may be pre-sized to be complementary to the size and geometry of the recess 38 of the lower die 24. The recess 38 may maintain the relative positioning or registration of the composite layup 106 in the lower die 24 as the upper die 26 is brought into contact with the lower die 24. For example, the composite layup 106 may be formed as a laminate of fibrous material pre-impregnated with uncured resin 110 or composite prepreg 108 material formed in a geometry that is complementary to the geometry or size of the recess 38.

Referring still to FIG. 2, shown is the release film 40 which may be inserted between the upper die 26 and the composite layup 106 and/or between the lower die 24 and the composite layup 106. As mentioned above with regard to the optional release coating that may be applied to the upper and/or lower dies 26, 24, the release film 40 may facilitate separation of the composite layup 106 from the upper and/or lower dies 26, 24 such as after curing of the composite layup 106. The release film 40 may be provided in any suitable size and shape. For example, the release film 40 may be sized and configured to approximate the size of the composite layup 106 or the size of the upper and/or lower dies 26, 24. The release film 40 may be formed of any suitable material that is conformable to the upper and lower mold surfaces 30, 32 and which is capable of withstanding the temperatures and pressures to which the composite layup 106 may be subjected. For example, the release film 40 may be formed of non-metallic film and/or metallic sheet. In an embodiment, the release film 40 may be formed of a polyimide film such as Kapton film commercially-available from E. I. du Pont de Nemours & Co. However, the release film 40 may be formed of any one of a variety of commercially-available films having suitable strength and heat resistance (i.e., high melt temperature).

Referring to FIG. 3, shown is the composite structure 104 formed from the composite layup 106 of FIG. 2 using the electromagnetic press 12 in a stationary operation wherein a single pre-formed composite layup 106 may be formed in one-at-a-time fashion. As can be seen, the composite structure 104 includes opposing upper and lower mold lines 34, 36 formed by respective ones of the upper and lower mold surfaces 30, 32 of the corresponding upper and lower dies 26, 24. As indicated above, the composite structure 104 may be provided as a composite layup 106 fabricated of any suitable material such as a composite prepreg 108 as shown in FIG. 2. The composite layup 106 may preferably, but optionally, be pre-formed to be complementary to a size and configuration of the upper and lower dies 26, 24.

Curing of the composite layup 106 of FIG. 2 into the composite structure 104 of FIG. 3 may be facilitated by application of the compressive force using the electromagnetic press 12 after the upper and lower dies 26, 24 are moved into contacting relation with the composite layup 106. As indicated above, application of electric current to the magnetic coil 44 of the electromagnet 42 draws the upper and lower dies 26, 24 together such that a compressive force is applied to the composite layup 106 of FIG. 2. The magnitude of the compressive force may be regulated by controlling the amount of the electric current applied to the magnetic coil 44. Heat may be applied at any time prior to or during the curing process by providing a heated environment 73 within which the composite layup 106 may be present. The heated environment 73 may facilitate reducing a viscosity of the uncured resin 110 in the composite layup to promote dispersion through the fiber-reinforced material 109.

The composite layup 106 may be pre-heated to a temperature that facilitates conformance of the composite layup 106 to the contours of the upper and/or lower dies 26, 24. Heat may be provided by the heating mechanism 70 which may be configured as the heating elements 72 shown in FIGS. 2 and 3. Heat may also be provided using inductive heating of the conductive frame 46 and upper die 26 occurring as a result of energization of the magnetic coil 44 as described above. Likewise, cycle time may be reduced using the cooling mechanism 80 optionally included with the electromagnetic press 12 in order to reduce the amount of time required to reduce the temperature of the composite structure 104 to a temperature that allows for removal of the composite structure 104 from the electromagnetic press 12. In an embodiment, the cooling mechanism 80 may comprise one or more conduits or passages that may be formed in the upper and lower dies 26, 24 or in any portion of the stationary or movable tools 14, 16. Coolant such as water may be circulated through the conduits or passages although any type of coolant may be used.

Figure 4:
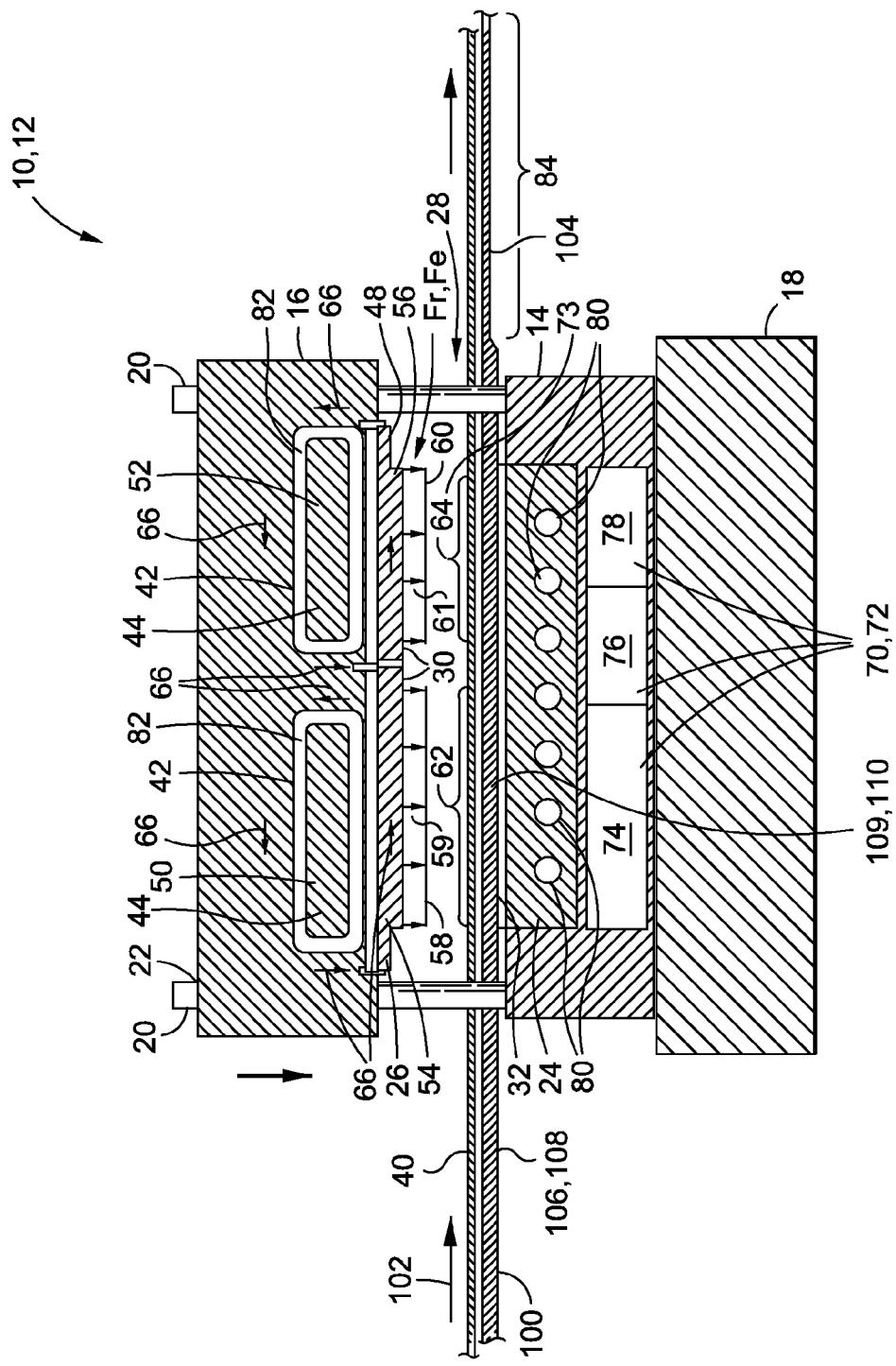
FIG. 4 is a side view of the electromagnetic press taken along line 4-4 of FIG. 2 and illustrating an embodiment for continuous forming of composite structures from a length of the composite layup inserted into a spacing between the upper and lower dies and further illustrating first and second coils and first, second and third heating zones for applying variable pressure and heat to the composite layup.

Referring to FIG. 4, shown is a side view of the electromagnetic press 12 similar to that which is shown in the front schematic views of FIGS. 2-3 but illustrating an embodiment comprising a plurality of magnetic coils 44 mounted in series relative to one another. By providing multiple magnetic coils 44 within the electromagnetic press 12, different magnitudes of compressive force may be simultaneously applied to different areas of the composite layup 106. Different magnitudes of compressive force may be applied by transmitting different levels of electric current to identically-configured magnetic coils 44 disposed in side-by-side arrangement. Alternatively, the magnetic coils 44 may be configured differently with different numbers of windings or different magnetic core geometries and configurations such that the application of equal amounts of current to the magnetic coils 44 results in the application of different magnitudes of compressive force to the composite layup 106.

For example, FIG. 4 illustrates an arrangement wherein the magnetic coil 44 comprises a first coil 50 and a second coil 52 disposed in series relative to one another. In this regard, the first and second coils 50, 52 are shown arranged in series relative to the material feed direction 102 of the composite layup 106. As may be appreciated, the magnetic coils 44 may also be provided in a side-by-side arrangement or in a lateral relationship to one another or in any other lateral, longitudinal or staggered relation to one another. After the upper and lower dies 26, 24 are brought into contact with the composite layup 106, the first and second coils 50, 52 are energized by transmitting electric current thereto to create the electromagnetic force Fe shown as a repulsive force Fr urging a first membrane 54 and second membrane 56 away from the respective first and second coils 54, 56. The first and second membranes may be configured as generally rigid members. When energized, the first coil 50 results in the application of a first compressive force 59 through the first membrane 54 to the first area 62 of the composite layup 106. Likewise, energization of the second coil 52 results in the application of a second compressive force 61 through the second membrane 56 to a second area 64 of the composite layup 106 as shown in FIG. 4. The application of the compressive forces may occur within corresponding first and second pressure zones 58, 60 of the electromagnetic press 12. As may be appreciated, any number of magnetic coils 44 in similar or different configurations may be provided in any relative arrangement in the electromagnetic press 12.

In like manner, the electromagnetic press 12 may include multiple heating zones as schematically illustrated in FIG. 4. For example, the electromagnetic press 12 may include a first heating zone 74, a second heating zone 76 and a third heating zone 78. The first heating zone 74 may heat a portion of the composite layup 106 to a temperature that is different than the temperatures to which the second and third heating zones 76, 78 may heat the composite layup 106. Although FIG. 4 illustrates an arrangement of first, second and third heating zones 74, 76, 78 disposed in series relative to the material feed direction 102 of the composite layup 106, the first, second and third heating zones 74, 76, 78 may be disposed in any arrangement relative to one another. Furthermore, the electromagnetic press 12 may include any number of heating zones in any arrangement. Each one of the heating zones may comprise any heating mechanism 70 configuration including, without limitation, the above-mentioned electrical heating elements 72 or as a plurality of conduits for circulating heating fluid through the electromagnetic press 12. The heating mechanism 70 may be provided in any other suitable configuration for applying heat to the composite layup 106. For example, the heating zones may comprise heating as a result of energization of one or more magnetic coils 44 by the application of electrical current as described above with regard to the inductive heating of the conductive frame 46 and the upper die 26.

Referring still to FIG. 4, the electromagnetic press 12 may further include one or more cooling mechanisms 80 as illustrated in FIG. 4 for cooling the composite layup 106 during the curing process or for cooling the composite structure 104 after curing. The cooling mechanisms 80 may comprise a plurality of conduits or passages for circulating coolant such as water. The circulating coolant provides a means for reducing the temperature of the upper and lower dies 26, 24 and the composite layup 106. The cooling mechanisms 80 may be included in any portion of the electromagnetic press 12 as described above with reference to FIGS. 2-3 and are not limited to installation in the lower dies 24 as illustrated in FIG. 4.

A length of release film 40 may be installed between the composite layup 106 and the upper and/or lower dies 26, 24 as a means to facilitate separation of the composite layup 106 from the upper and/or lower dies 26, 24 such as after curing of the composite layup 106. The release film 40 may be formed of any suitable material including any metallic or non-metallic material as described above and may be advanced through the electromagnetic press 12 along the material feed direction 102 in registration with the length of composite layup 106 during a continuous forming process.

For example, as shown in FIG. 4, the electromagnetic press 12 may facilitate the consolidation or curing of a plurality of composite structures 104 in a continuous forming process. More specifically, FIG. 4 illustrates an embodiment of the electromagnetic press 12 employed in a manner to form one or more consolidation zones 84 in a length of the composite layup 106. Each one of the consolidation zones 84 may represent one of a plurality of cured composite structures 104 formed from the length of the composite layup 106 material. Each one of the composite structures 104 may be removed from the length of the composite layup 106 by any suitable processes following curing.

After forming a consolidation zone 84 or curing a composite structure 104 as represented by a consolidation zone 84, material may be advanced along the material feed direction 102 into the spacing 28 between the upper and lower dies 26, 24. The upper and lower dies 26, 24 may then be moved toward one another by means of the actuation mechanism 22 such that the upper and lower dies 26, 24 are again placed in contacting relation with the composite layup 106. After the upper and lower dies 26, 24 are placed in contacting relation with the composite layup 106, the electromagnet 42 may again be energized such that the upper and lower dies 26, 24 apply a compressive force to the composite layup 106 to form another one of the consolidation zones 84. Heat may be applied using the heating mechanism 70 such as the heating element(s) 72 and/or by using the inductive heating of the conductive frame 46 and upper die 26 upon energization of the magnetic coil 44. The upper and lower dies 26, 24 may then be separated to allow for advancing of the length of the composite layup 106 along the material feed direction 102. As can be seen in FIG. 4, the length of composite layup 106 extending out of the electromagnetic press 12 includes a consolidation zone 84 which may represent a cured composite structure 104. The consolidation zone 84 may have a reduced thickness as compared to the remainder of the uncured or unconsolidated length of the composite layup 106. Each one of the cured composite structures 104 may be later removed from the length of composite layup 106 material.

Figure 5:
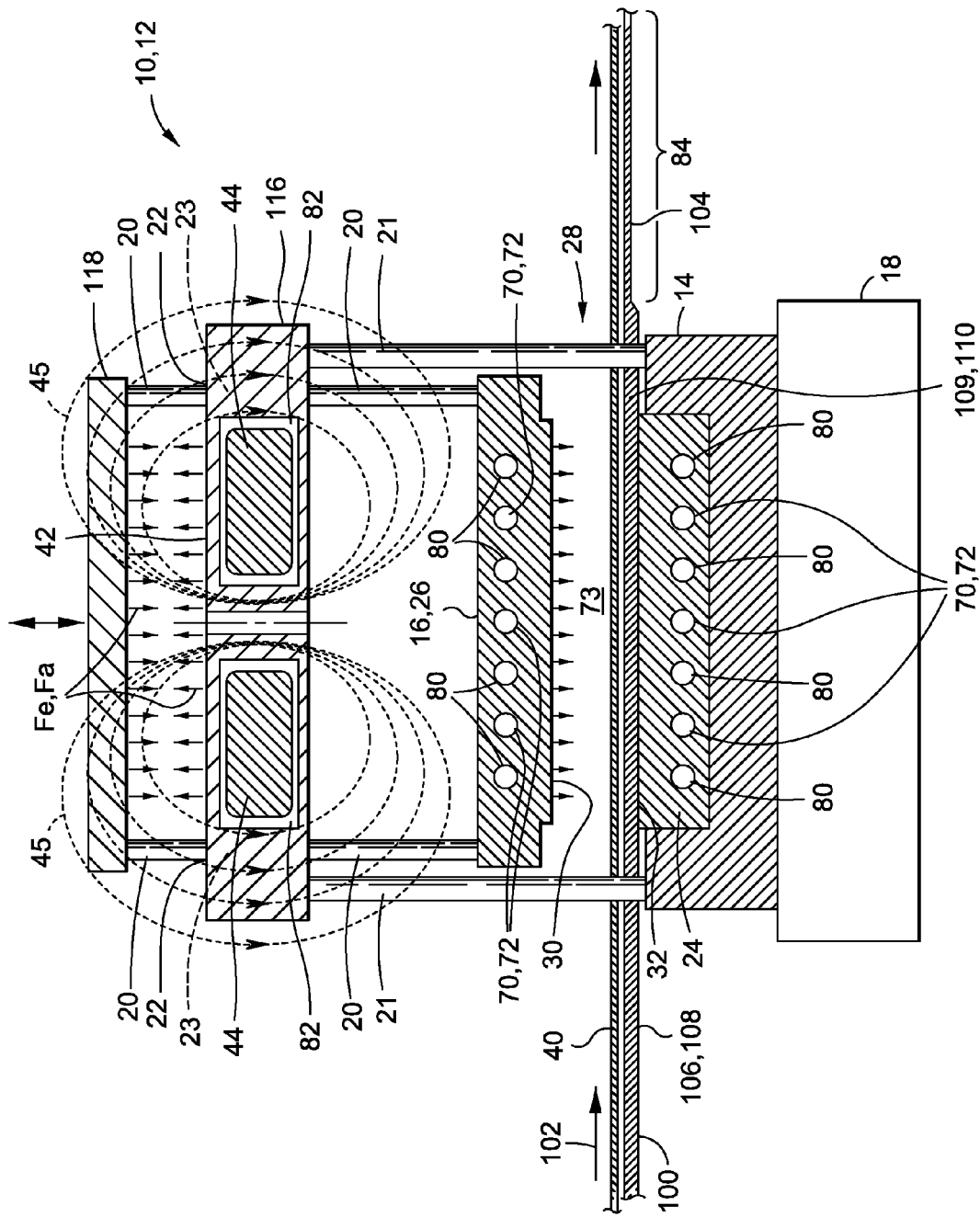
FIG. 5 is a side view of the electromagnetic press illustrating an embodiment having a movable magnetic member and a stationary magnetic member including the electromagnet for drawing together the upper and lower dies.

Referring to FIG. 5, shown is an embodiment of the electromagnetic press 12 wherein the electromagnet 42 may be located remotely relative to the upper and lower dies 26, 24. In this regard, the electromagnet 42 may be mounted in spaced relation to the upper and lower dies 24. The electromagnet 42 may comprise a fixed magnetic member 116 that may be fixedly mounted in spaced relation to the stationary tool 14 that supports the lower die 24 as shown in FIG. 5. The fixed magnetic member 116 may be supported on one or more posts 21 extending upwardly from the stationary tool 14. Alternatively, the fixed magnetic member 116 may be supported independently of the stationary tool 14 or lower die. For example, the fixed magnetic member 116 may be supported by structure located adjacent to the electromagnetic press 12 but which is independent thereof. Regardless of the structural arrangement, the fixed magnetic member 116 or electromagnet 42 is configured to be immovable relative to the lower die 24.

The electromagnetic press 12 shown in FIG. 5 may further include a movable magnetic member 118 that may be coupled to the upper die 26 such that the movable magnetic member 118 and the upper die 26 move in unison. For example, the movable magnetic member 118 may be coupled to the upper die 26 by means of one or more shafts 20 that may extend through a corresponding number of bores 23 that may be formed in the fixed magnetic member 116. However, any one of a variety of alternative configurations may be provided for movably coupling the movable magnetic member 118 and upper die 26 other than the arrangement illustrated in FIG. 5. As can be seen, the movable magnetic member 118 is disposed on a side of the fixed magnetic member 116 that is opposite the upper die 26. In this regard, upper die 26 is positioned between the lower die 24 and the fixed magnetic member 116. The movable magnetic member 118 may be positioned above the fixed magnetic member 116. The movable magnetic member 118 is preferably fabricated of ferrous material or other suitable magnetically attractive material. Likewise the fixed magnetic member 116 may be fabricated of a magnetically attractive material.

As can be seen in FIG. 5, the upper and lower dies 26, 24 are mounted in spaced relation to one another for receiving the composite layup 106 in a manner similar to that which is described above with reference to FIGS. 2-4. In this regard, the upper and lower dies 26, 24 are movable into contacting relation with the composite layup 106 by activating one or more actuation mechanisms 22 for positioning the movable magnetic member 118 relative to the fixed magnetic member 116. The movable magnetic member 118 may be drawn toward the fixed magnetic member 116 due to a magnetic field 45 created upon energization of the electromagnet 42. The resulting in the electromagnetic force Fe, shown as the attractive force Fa, draws the movable magnetic member 118 closer toward the fixed magnetic member 116 causing the upper and lower dies 26, 24 to apply the compressive force to the composite layup 106. Upon consolidation of the composite layup 106, the electromagnet 42 may be de-energized and the movable magnetic member 118 may be moved away from the fixed magnetic member 116. The composite layup 106 and release film 40 may be advanced through the electromagnetic press 12 and the process may be repeated as described in greater detail below.

For the electromagnetic press 12 configuration of FIG. 5, the upper and lower dies 26, 24 may be fabricated of non-magnetically attractive material to minimize attraction with the energized electromagnet 42 although any material may be used for fabricating the upper and lower dies 26, 24. The electromagnetic press 12 configuration of FIG. 5 may facilitate forming a composite structure 104 in one-at-a-time manner as described above with regard to FIGS. 2-3. In addition, the electromagnetic press 12 configuration of FIG. 5 may facilitate continuous forming of consolidation zones 84 and/or composite structures 104 in a continuous manner from a length of composite material 106 that may be continuously advanced through the electromagnetic press 12 as described with regard to FIG. 4.

Advantageously, the remote mounting of the electromagnet 42 relative to the upper and lower dies 26, 24 as shown in FIG. 5 may provide an increase in the area or volume that is available in the upper die 26 to accommodate heating mechanisms 70 and/or cooling mechanisms 80 relative to the amount of area available in the upper die 26 illustrated in FIGS. 2-4. For example, as shown in FIG. 5, each one of the upper and lower dies 26, 24 may include one or more heating mechanisms 70 configured to apply heat to the composite layup 106. Such heating mechanisms 70 may be similar to the heating mechanism 70 configurations described above with reference to FIGS. 2-4. For example, the heating mechanisms 70 may comprise one or more heating elements 72 such as electrical heating elements 72 and/or as passages for circulating heating fluid. Likewise, the upper and lower dies 26, 24 may include one or more cooling mechanisms 80 for circulating coolant such as water for rapidly cooling the upper and lower dies 26, 24 and drawing heat from the composite layup 106.

In addition, the remote mounting of the electromagnet 42 may result in a relatively larger amount of area for accommodating the electromagnet 42 which may increase the degree with which the magnetic attraction may be controlled. In this manner, the arrangement of electromagnetic press 12 of FIG. 5 may increase the controllability of the compressive force applied by the upper and lower dies 26, 24 to the composite layup 106 during curing and/or consolidation. Furthermore, the arrangement of electromagnetic press 12 illustrated in FIG. 5 may increase the accuracy of positioning the upper and lower dies 26, 24 relative to one another due to increased controllability of the attraction between the electromagnet 42 and the movable magnetic member 118.

Figure 6:
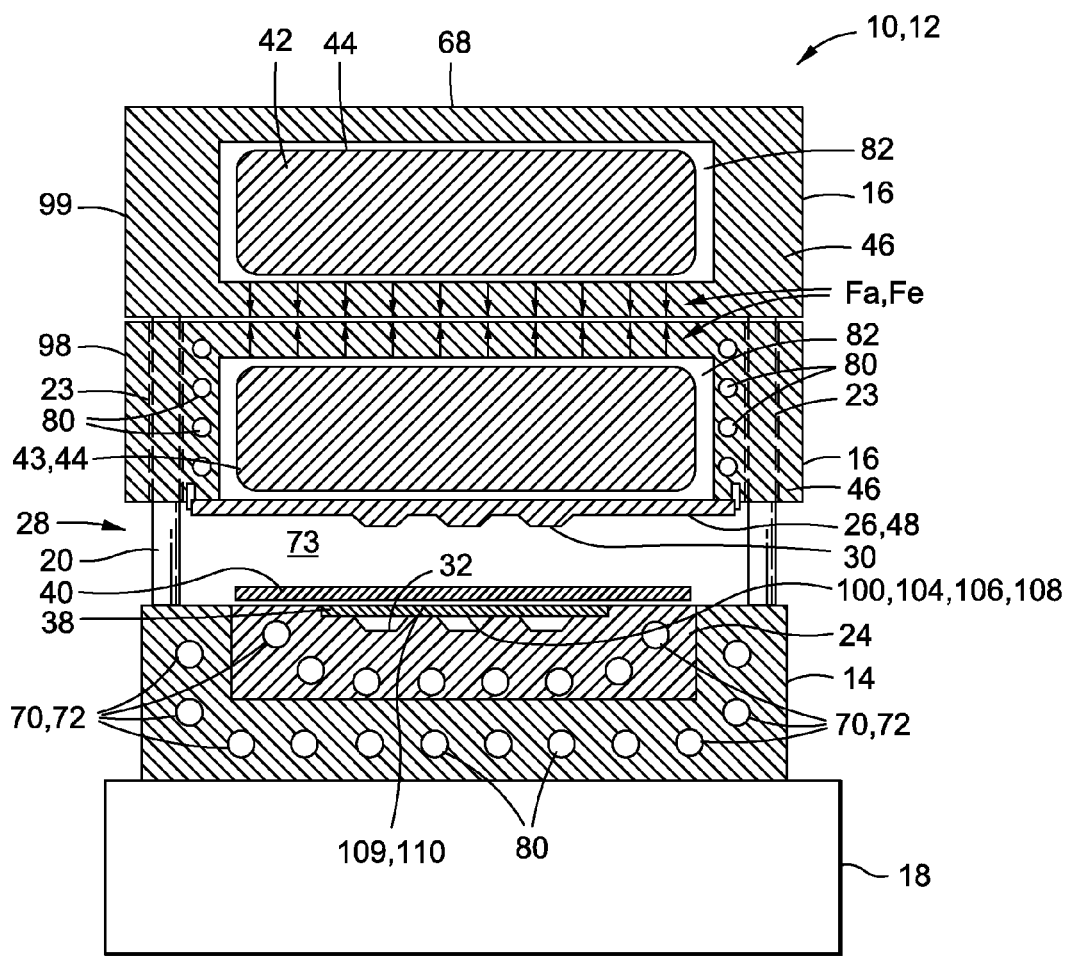
FIG. 6 is a side view of the electromagnetic press illustrating an embodiment having a first electromagnetic mechanism disposed above a second electromagnetic mechanism and wherein an attractive force therebetween maintains a spacing between the upper and lower dies.
Figure 7:
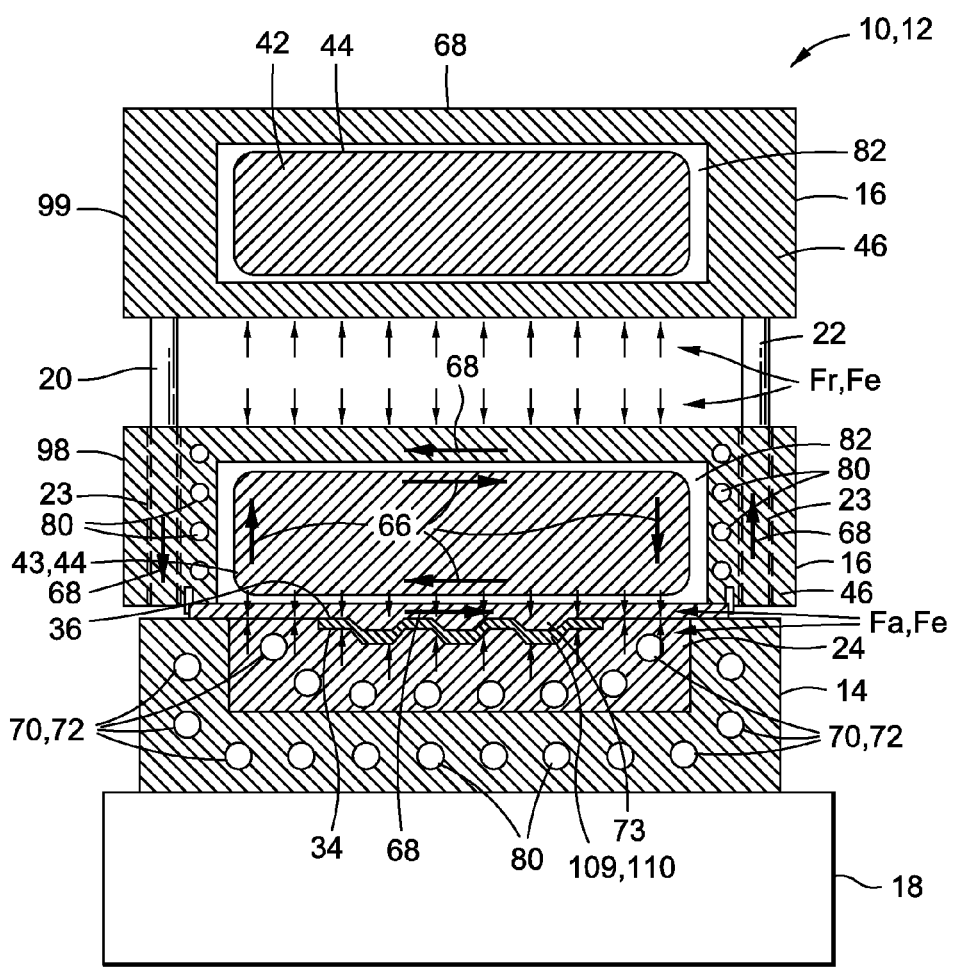
FIG. 7 is a side view of the electromagnetic press in the embodiment of FIG. 6 and illustrating a repulsive force between the first and second electromagnetic mechanisms.

Referring to FIGS. 6-7, shown is the electromagnetic press in an embodiment having a first electromagnetic mechanism 98 disposed in movable relation to a second electromagnetic mechanism 99 that may be fixed in position. As can be seen, the upper die 26 may be coupled to the first electromagnetic mechanism 98. The lower die 24 may be mounted to the stationary tool 14. The lower die 24 may be positionable in spaced relation to the upper die 26 for receiving the composite layup 106. The second electromagnetic mechanism 99 may be fixedly mounted to the stationary tool 14. For example, the second electromagnetic mechanism 99 may be supported above the first electromagnetic mechanism 98. In an embodiment, the second electromagnetic mechanism 99 may be supported on the shafts 20 extending upwardly from the stationary tool 14 similar to that which was described above with regard to the embodiment of the electromagnetic press illustrated in FIG. 2. Alternatively, the second electromagnetic mechanism 99 may be supported by alternative means such as by structure that is independent of the electromagnetic press 12.

As shown in FIGS. 6-7, the second electromagnetic mechanism 99 may be positioned on a side of the first electromagnetic mechanism 98 opposite the lower die 24. For example, the second electromagnetic mechanism 99 may be positioned above the first electromagnetic mechanism 98. Each one of the first and second electromagnetic mechanisms 98, 99 may include at least one electromagnet 42 comprising a magnetic coil 44. The magnetic coil 44 of the second electromagnetic mechanism 99 may be energizable by applying electric current to generate an electromagnetic force Fe which may be an attractive force Fa as shown in FIG. 6 or a repulsive force Fr as shown in FIG. 7. In this regard, the second electromagnetic mechanism 99 may be configured to have reversible polarity. The attractive force Fa may be generated between the first and second electromagnetic mechanisms 98, 99 as shown in FIG. 6 such that the first electromagnetic mechanism 98 is attracted to or is drawn toward the second electromagnetic mechanism 99. The repulsive force Fr may be generated between the first and second electromagnetic mechanisms 98, 99 as shown in FIG. 7 such that the first electromagnetic mechanism 98 may be repelled from the second electromagnetic mechanism 99. The first electromagnetic mechanism 98 may include one or more bores 32 formed therein and which may be sized and configured to be slidable along a corresponding number of the shafts 20 such that the first electromagnetic mechanism 98 is movable between the positions shown in FIGS. 6-7.

The lower die 24 may include the recess 38 for receiving the composite layup 106 which may be formed of fiber-reinforced material 109 and uncured resin 110 although the composite layup 106 may be formed of any one of a variety of different material systems as described in greater detail below. The release film 40 which may be inserted between the upper die 26 and the composite layup 106 and/or between the lower die 24 and the composite layup 106. Alternatively, composite layup 106 may be configured to receive a length of composite material in a manner similar to that which is described above with reference to the embodiment of the electromagnetic press 12 illustrated in FIG. 5. In addition, as indicated above, either one of the upper and lower dies 26, 24 may be configured as the pressure membrane 48. The pressure membrane 48 may facilitate fabrication of the composite structure 104 where precise control of the contour on one of the opposing sides of the composite structure 104 may not be required. One of the upper and lower dies 26, 24 may be provided as a generally rigid structure positioned on a side of the composite layup 106 opposite the pressure membrane 48. A generally rigid upper or lower die 26, 24 may facilitate accurate control of a corresponding one of the upper and lower mold surfaces 30, 32 of the cured composite structure 104.

As shown in FIG. 6, the composite layup 106 is receivable between the upper and lower dies 26, 24 when the second electromagnetic mechanism 99 is energized to generate the attractive force Fa which may draw the first electromagnetic mechanism 98 and upper die 26 upwardly away from the lower die 24. The attractive force Fa between the first and second electromagnetic mechanisms 98, 99 may maintain the spacing 28 between the upper and lower dies 26, 24 such that the composite layup 106 may be received therebetween. The first electromagnetic mechanism 98 may remain de-energized while the second electromagnetic mechanism 99 is energized such that the attractive force Fa is maintained between the first and second electromagnetic mechanisms 98, 99.

As shown in FIG. 7, the repulsive force Fr may be generated relative to the first and second electromagnetic mechanisms 98, 99 upon reversal of polarity of the second electromagnetic mechanism 99 to cause the first electromagnetic mechanism 98 to be repelled from the second electromagnetic mechanism 99. The first electromagnetic mechanism 98 may then be energizable to cause the first electromagnetic mechanism 98 to be attracted to the stationary tool 14 or lower die 24 such that the upper and lower dies 26, 24 may be moved into contact with the composite layup 106 and compress the composite layup 106. The magnitude of the compressive force applied to the composite layup 106 may be varied by varying an amount of electrical current applied to the electromagnet 42 of the first electromagnetic mechanism 98.

The first electromagnetic mechanism 98 may include the conductive frame 46 at least partially surrounding the magnetic coil 44 such that energization of the magnetic coil 44 causes inductive heating of the upper die 26 in a manner described above with regard to the embodiment of the electromagnetic press 12 illustrated in FIGS. 2-3. In addition, the embodiment of the electromagnetic press 12 illustrated in FIGS. 6-7 may include one or more heating mechanisms 70 and/or cooling mechanisms 80 mounted to the electromagnetic press 12 for heating at least one of the upper and lower dies 26, 24 in order to reduce the viscosity of uncured resin 110 in the composite layup 106 and/or to promote curing of the uncured resin 110.

Figure 8:
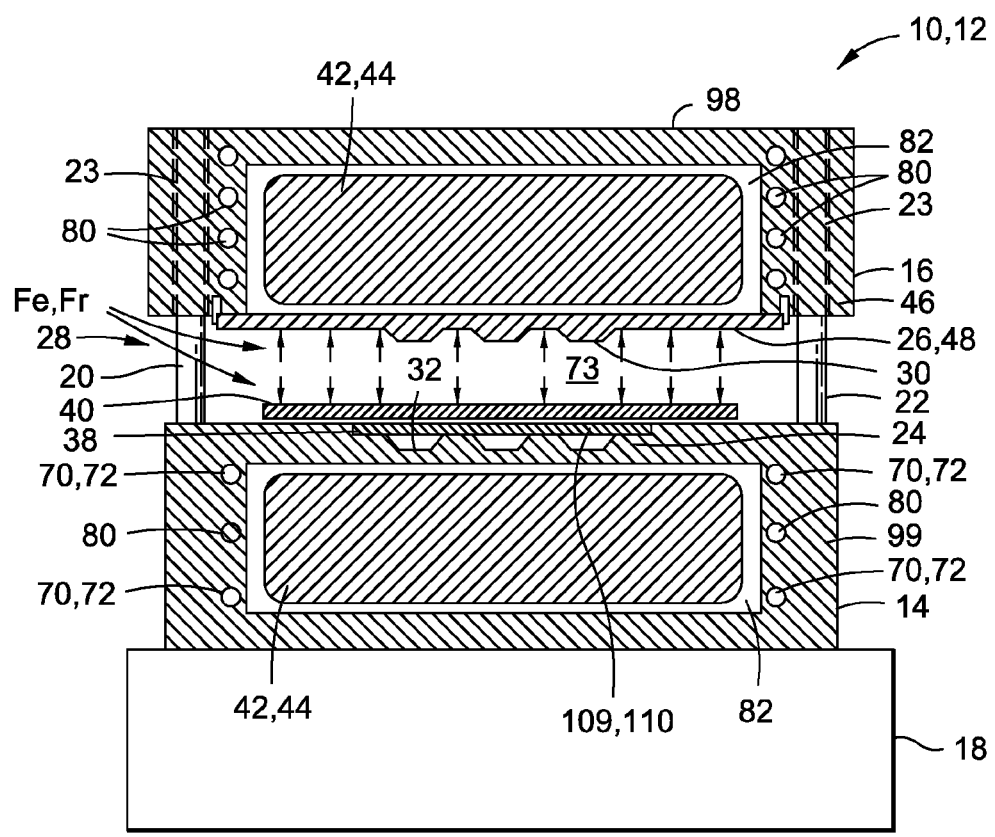
FIG. 8 is a side view of the electromagnetic press illustrating an embodiment having first and second electromagnetic mechanisms and further illustrating a repulsive force generated therebetween to maintain the spacing between the upper and lower dies.
Figure 9:
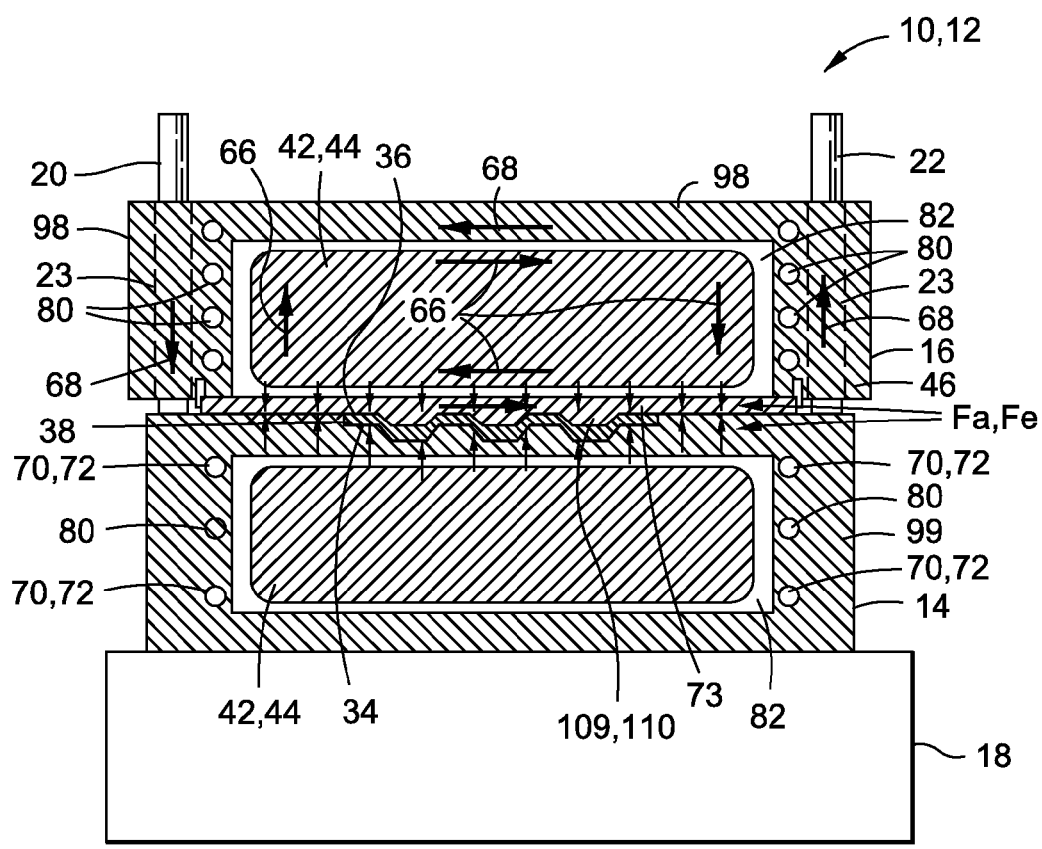
FIG. 9 is a side view of the electromagnetic press in the embodiment of FIG. 8 and illustrating an attractive force between the first and second electromagnetic mechanisms causing the upper and lower dies to apply a compressive force to the composite layup.

Referring to FIGS. 8-9, shown is the electromagnetic press 12 in an embodiment having the first electromagnetic mechanism 98 disposed in movable relation to the second electromagnetic mechanism 99 which may be fixed in position. The first electromagnetic mechanism 98 may have the upper die 26 coupled thereto. The second electromagnetic mechanism 99 may have the lower die 24 coupled thereto. The first electromagnetic mechanism 98 may be supported on the shafts 20 extending upwardly from the stationary tool 14 similar to that which was described above with regard to the electromagnetic press 12 illustrated in FIG. 2. The first electromagnetic mechanism 98 may include one or more bores 32 which may be sized and configured to be slidable along a corresponding number of the shafts 20 such that the first electromagnetic mechanism 98 is movable between the positions shown in FIGS. 8-9.

The first and second electromagnetic mechanisms 98, 99 may be configured such that the electromagnetic force Fe is generated which may be the repulsive force Fr as shown in FIG. 8 or the attractive force Fa as shown in FIG. 9 depending upon the polarity of the second electromagnetic mechanism 99. The repulsive force Fr in FIG. 8 may cause the first electromagnetic mechanism 98 to be moved upwardly away from the second electromagnetic mechanism 99 such that the composite layup 106 may be received within the spacing 28. The repulsive force Fr may be generated when the second electromagnetic mechanism 99 is energized. The first electromagnetic mechanism 98 may be configured to be maintained in a de-energized state when the second electromagnetic mechanism 99 is energized.

FIG. 9 illustrates the first and second electromagnetic mechanisms 98, 99 drawn toward one another as a result of the generation of the attractive force Fa between the first and second electromagnetic mechanisms 98, 99. The attractive force Fa may be generated by reversing the polarity of the second electromagnetic mechanism 99 to cause the upper and lower dies 26, 24 to move into contacting relation with the composite layup 106. The second electromagnetic mechanism 99 may be de-energized and the first electromagnetic mechanism 98 may be energized to cause the upper and lower dies 26, 24 to compress the composite layup 106 for consolidation and/or curing thereof. The first and second electromagnetic mechanisms 98, 99 may include at least one electromagnet 42 comprising the magnetic coil 44 which may be energizable by an electric current. Upon consolidation and/or curing of the composite layup 106 into the composite structure 104 shown in FIG. 9, the first electromagnetic mechanism 98 may be de-energized and the second electromagnetic mechanism 99 may be energized at reversed polarity to generate the repulsive force Fr between the first and second electromagnetic mechanisms 98, 99 as shown in FIG. 8. The repulsive force Fr may cause the first electromagnetic mechanism 98 to move away from the second electromagnetic mechanism 99 resulting in the separation of the upper and lower dies 26, 24 and allowing for removal of the composite layup 106 from the electromagnetic press 12.

Figure 10A:
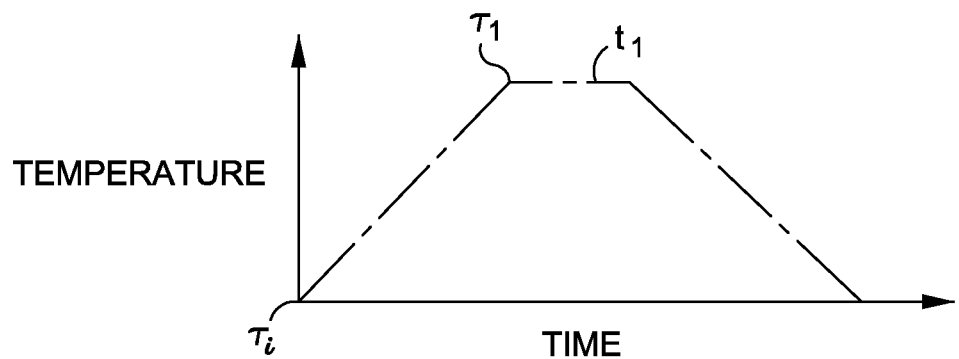
FIG. 10A is a graph illustrating a temperature profile for heating the composite layup to a first temperature maintained over a first time period during a consolidation or curing cycle of a composite layup using the electromagnetic press.

Referring to FIG. 10A, shown is a graph illustrating a temperature profile of the composite layup 106 such as that which is shown in FIGS. 2-9 during a consolidation or curing cycle. During such a consolidation cycle, the compressive force may be applied to the composite layup 106 in a controlled manner by the electromagnetic press 12 by controlled application of electric current to the magnetic coil 44 as shown in FIGS. 2-9. The temperature of the composite layup 106 may be elevated by applying heat to the composite layup 106 using one or more of the heating mechanisms 70. As was earlier mentioned, the heating mechanism 70 may comprise the conductive frame 46 and upper die 26 which may be inductively heated upon energization of the magnetic coil 44. The heating mechanism 70 may also comprise one or more of the heating elements 72 which may be electrically-powered or which may comprise a plurality of conduits through which heated fluid may be circulated as shown in FIGS. 2-9.

As illustrated in FIG. 10A and with additional reference to FIGS. 2-9, the composite layup 106 may be heated from an initial temperature $T_i$ to a first temperature $T_1$ while a compressive force (e.g., 300 psi) is maintained on the composite layup 106. However, the compressive force may also be varied during application of heat to the composite layup 106. The composite layup 106 may be maintained at the first temperature $T_1$ for a first time period $t_1$ which may be a period of time sufficient to reduce the viscosity of uncured resin 110 in the composite layup 106. In addition, maintaining the composite layup 106 at the first temperature $T_1$ may promote consolidation of the fiber-reinforced material 109 and promote curing of the uncured resin 110. Toward this end, various sensors (not shown) may be installed in the electromagnetic press 12 to sense any one of a variety of different environmental or system conditions including, but not limited to, pressure and temperature sensors to sense the temperature of the composite layup 106 and the compressive force exerted thereupon during energization of the magnetic coil 44.

Figure 10B:
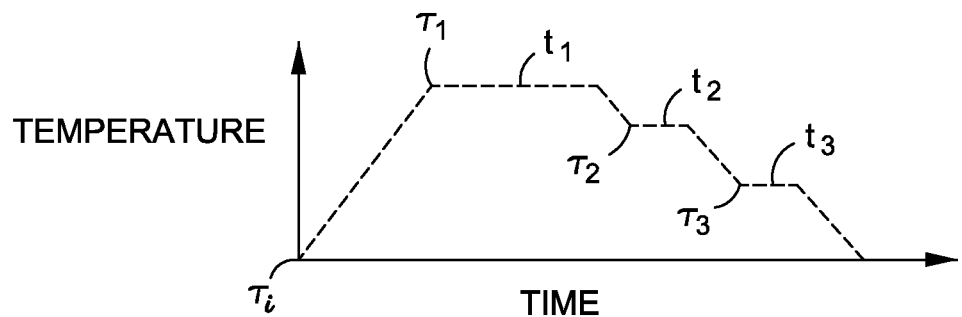
FIG. 10B is a graph illustrating a temperature profile for heating the composite layup to the first temperature and incremental reduction thereof to a second and third temperature maintained over corresponding second and third time periods using the electromagnetic press.

Referring to FIG. 10B and with reference to FIGS. 2-9, shown is a graph of a temperature profile in an embodiment of a curing or consolidation cycle. As illustrated in FIG. 10B, the composite layup 106 of FIGS. 2-9 may be heated to the first temperature $T_1$ from the initial temperature $T_i$ while compressive force is applied in the manner as was described above with reference to FIG. 10A. The composite layup 106 may be maintained at the first temperature $T_1$ over the first time period $t_1$. The temperature may be reduced in an incremental or stepwise manner. For example, the temperature may be reduced from the first temperature $T_1$ to a second temperature $T_2$. Such reduction in temperature may be facilitated by employing the coolant mechanism 80. The composite layup 106 may be maintained at the second temperature $T_2$ over the second time period $t_2$ followed by an incremental reduction to a third temperature $T_3$. The composite layup 106 may be maintained at the third temperature $T_3$ over a third time period $t_3$. Subsequent temperature steps may be implemented until completion of the cure or consolidation cycle after which the temperature of the composite layup 106 may be reduced to the initial temperature $T_i$ to allow for removal of the composite structure 104 from the electromagnetic press 12.

Referring generally to FIGS. 2-9, it should also be noted that the electromagnetic press 12 is not limited to use with prepreg material and/or resin impregnated material but may also be used with resin transfer molding (RTM) processes wherein dry fiber material (e.g., preform material) may be inserted into the spacing 28 between the upper and lower dies 26, 24. The upper and lower dies 26, 24 may be moved into contact with the composite layup 106 and resin may be introduced under vacuum or pressure to draw the uncured resin 110 throughout the entirety of the preform. Compressive force may be applied to the composite layup 106 using the electromagnetic press 12 during an RTM process to form the upper and lower mold lines 34, 36 of the composite layup 106 according to the contours of the upper and lower mold surfaces 30, 32 of the upper and lower dies 26, 24, respectively. Heat may be applied to reduce the viscosity of the uncured resin 110 to promote dispersion thereof through the preform and to promote curing in a manner known in the art.

In this regard, the electromagnetic press 12 as disclosed herein may be used for forming composite structures from a variety of different material combinations including, without limitation, thermoplastic and thermosetting resin systems using fibrous material of any composition. For example, the fibrous material may comprise, without limitation, fibers formed of carbon, fiberglass, aramid and any other metallic and/or non-metallic material. The fibers may be provided in any size, shape and configuration including, without limitation, particulate form or as short fibers, long fibers or any combination thereof. The electromagnetic press 12 may be used to form any continuous or discontinuous fiber-reinforced polymeric composite structures having any ply layup or stacking sequence. In this regard, composite structures may be formed from any suitable prepreg carbon/polymer system or any thermoplastic or thermosetting liquid molding system.

Figure 12:
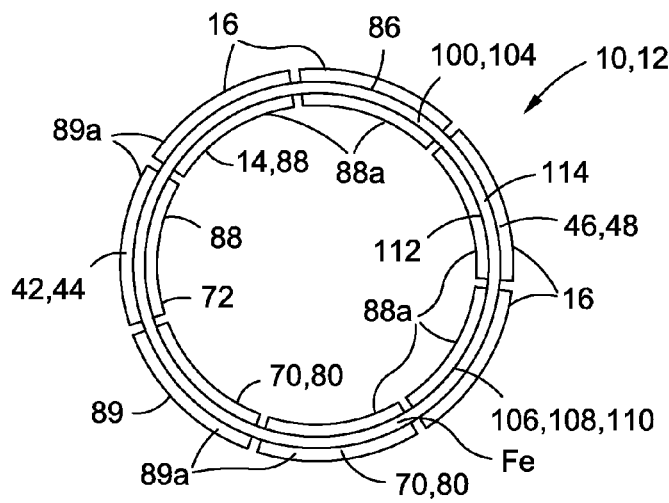
FIG. 12 is a top view of the electromagnetic press taken along line 12-12 of FIG. 11 and illustrating inner and outer dies movable into contacting relation to the composite layup for applying the compressive force.
Figure 11:
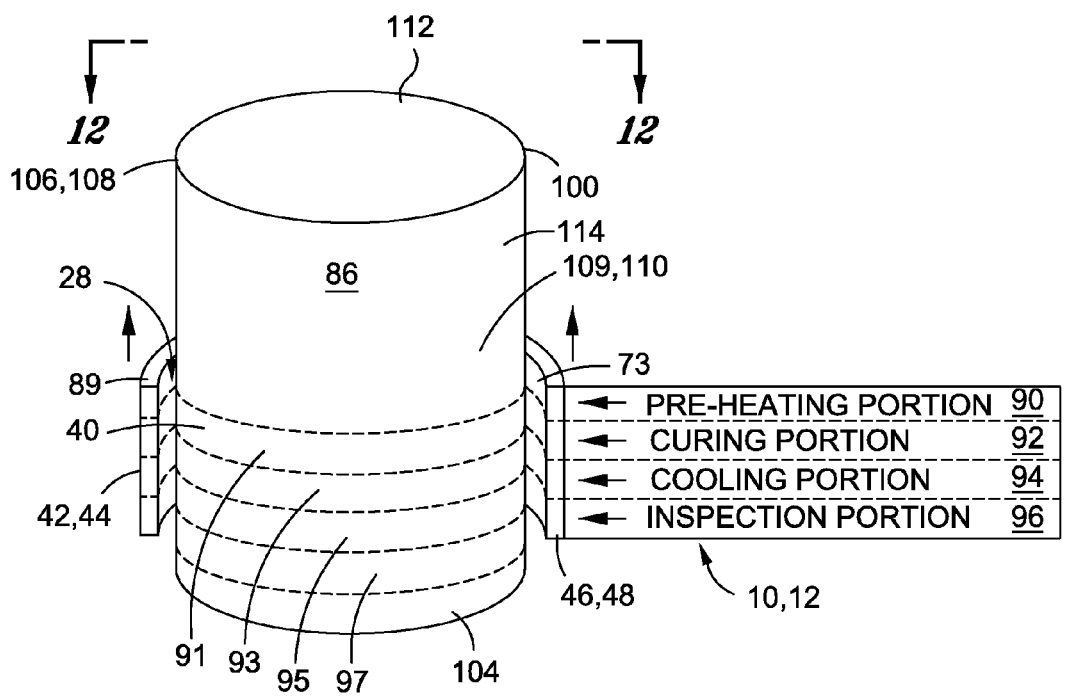
FIG. 11 is a perspective view of the electromagnetic press in an embodiment configured to be incrementally movable along a composite layup in a barrel section configuration wherein the electromagnetic press is configured to apply compressive force to the composite layup.

Referring to FIGS. 11-12, shown is an electromagnetic press 12 partially cut away for illustration purposes and wherein the electromagnetic press 12 is configured to be movable along a stationary composite layup 106 to form the composite structure 104. For example, the electromagnetic press 12 may be configured to be incrementally movable along the composite layup 106 to sequentially perform curing operations on the composite layup 106 without the need for autoclaving of the composite layup 106 as is typically required for applying the necessary temperature and pressure to the composite layup 106. In FIGS. 11-12, the composite layup 106 is illustrated as a barrel section 86 having inner and outer surfaces 112, 114 and which may be produced using any suitable layup process without limitation. For example, the barrel section 86 composite layup 106 may be produced using an automated tape laying system and/or by hand layup. Although the composite layup 106 is illustrated in FIGS. 11-12 as a barrel section 86 such as may comprise a portion of an aircraft fuselage, the composite layup 106 may be provided in a variety of alternative configurations for forming a composite structure 104 that may be used in any one of a variety of industries and in any application without limitation.

For example, the composite layup 106 may be provided in a configuration for forming a composite structure 104 that may be used in a section of a fuselage 122 or a wing 124 or a tail section 128 of an aircraft 120 such as that which is illustrated in FIG. 9.

The electromagnetic press 12 illustrated in FIGS. 11-12 may include one or more electromagnets 42. Each one of the electromagnets 42 may be fixedly coupled to an inner die 88 or to an outer die 89 similar to the coupling of the electromagnet 42 to one of the upper or lower dies 26, 24 of the electromagnetic press 12 configurations illustrated in FIGS. 2-4. In FIGS. 11-12, the inner die 88 may comprise a contiguous ferrous or otherwise magnetically attractable ring segment that may be configured or sized to generally approximate a contour of an inner surface 112 of the composite layup 106. However, the inner die 88 may comprise a plurality of segments such as inner die arc segments 88a that may be radially spaced along the inner surface 112 of the composite layup 106 as shown in FIG. 7. Each one of the inner die arc segments 88a may be radially movable into contacting relation with the inner surface 112 of the composite layup 106.

The outer die 89 may likewise comprise a plurality of outer die arc segments 89a that may be mounted in opposing spaced relation to a contiguous inner die 88 or to inner die arc segments 88a. The spaced relation of the inner and outer dies 88, 89 facilitates receipt of the composite layup 106 therebetween. The inner and outer dies 88, 89 may be radially movable in relation to one another. For example, the inner die 88 may be formed as a contiguous ring that may be generally stationary or non-movable in a radial direction similar to the stationary tool 14 of FIGS. 2-4 which supports the lower die 24. In FIGS. 11-12, the outer die 89 may be radially movable relative to the inner die 88 and may be formed complementary to the outer surface 114 of the composite layup 106. For example, the outer die 89 may comprise the plurality of the outer die arc segments 89a. One or more actuation mechanisms 22 may draw each one of the inner and outer die arc segments 88a, 89a into contacting relation to respective ones of the inner and outer surfaces 112, 114 of the composite layup 106. Each outer die arc segment 89a may include one or more electromagnets 42 such that energization of the magnetic coil 44 of each electromagnet 42 results in drawing the outer die arc segments 89a and inner die arc segments 88a radially toward one another to apply a compressive force to the portion of the composite layup 106 that is positioned or clamped therebetween.

The electromagnetic press 12 may be configured to be incrementally movable along a length of the composite layup 106 to successively apply the compressive force to portions of the composite layup 106. In this regard, the electromagnetic press 12 may include appropriate tooling or support structure 18 to maintain the position of the electromagnetic press 12 during each curing operation followed by incremental movement along the length of the composite layup 106. In an embodiment, the electromagnetic press 12 may include one or more heating mechanisms 70 disposed adjacent to at least one of the inner and outer dies 88, 89 to apply heat to the composite layup 106. For example, the heating mechanisms 70 may comprise heating elements 72 mountable within each one of the inner and/or outer dies 88, 89 for conductively heating the composite layup 106 in a manner similar to that which was described above with regard to the electromagnetic press 12 illustrated in FIG. 2-4. In addition, each one of the heating mechanisms 70 may comprise the electromagnet 42 having a magnetic coil 44 and a conductive frame 46 at least partially surrounding the magnetic coil 44 such that energization of the magnetic coil 44 causes inductive heating of at least the outer die 89 which may then conductively heat the composite layup 106.

The composite layup 106 may be formed of composite prepreg 108 by any suitable manner such as by using automated tape layup on a tool (not shown) such as a mandrel. Alternatively, the composite layup 106 may be formed using any one of a variety of suitable liquid molding systems. For example, a resin infusion system may be used wherein uncured resin 110 may be drawn into the composite layup 106 under vacuum using vacuum bags (not shown). Caul plates (not shown) may be applied to the composite layup 106 to form the outer surface 114. As may be appreciated, a variety of material systems may be used to form the composite layup 106 into a variety of sizes, shapes and geometries.

Referring still to FIGS. 11-12, the electromagnetic press 12 may include at least one of a pre-heating portion 90, a curing portion 92, a cooling portion 94 and an inspection portion 96 to form a self-contained curing system. The pre-heating portion 90 of the electromagnetic press 12 may facilitate heating of the composite layup 106 in a pre-heat zone 91. The pre-heating portion 90 may comprise the heating mechanisms 70 described above and which may be configured to apply heat to the pre-heat zone 91 of the composite layup 106 to facilitate consolidation and curing of the composite layup 106. The curing portion 92 of the electromagnetic press 12 may comprise the electromagnet 42 coupled to the inner or outer dies 88, 89 wherein energization of the magnetic coil 44 results in the application of compressive forces to the composite layup 106 as described above. The compressive forces may be applied with simultaneous application of heat to facilitate curing and consolidation of the composite layup 106 within the cure zone 93.

The cooling portion 94 comprises the cooling mechanisms 80 as described above and which may be included in one or more of the inner and/or outer dies 88, 89 and/or in supporting structure thereof. The cooling portion 94 may be configured to rapidly cool the composite layup 106. For example, the cooling portion 94 may facilitate a relatively rapid stepwise or incremental change in temperature of the composite layup 106 which may occur within a cooling zone 95 of the composite layup 106. The relatively rapid change in temperature of the composite layup may reduce the duration of the curing cycle. The inspection portion 96 may comprise any number of a variety of suitable composite inspection mechanisms known in the art. The inspection portion 96 may facilitate detection of out-of-tolerance properties in the inspection zone 97 of the cured composite structure 104 using any suitable inspection technique including, without limitation, non-destructive testing (NDT) techniques which may include the use of ultrasonics.

The electromagnetic press 12 illustrated in FIGS. 11-12 may be configured to sequentially perform the above-described pre-heating, curing, cooling and/or inspection steps while incrementally moving the electromagnetic press 12 along the length thereof. The composite layup 106 is illustrated in FIG. 7 as being vertically oriented to eliminate the gravitational effects that may otherwise result in sag in a horizontally-oriented composite layup 106. However, the composite layup 106 may be positioned in any suitable orientation.

Figure 13:
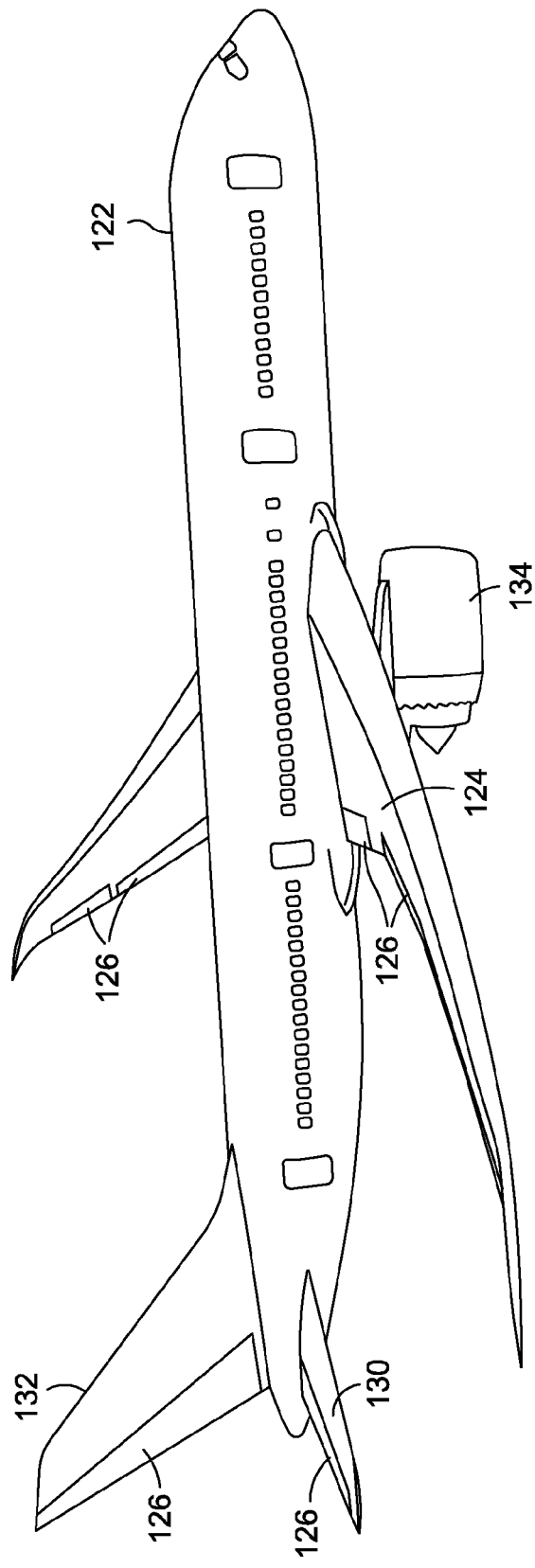
FIG. 13 is a perspective illustration of an aircraft which may include a composite structure as may be formed using an embodiment of the electromagnetic press.
Figure 21:
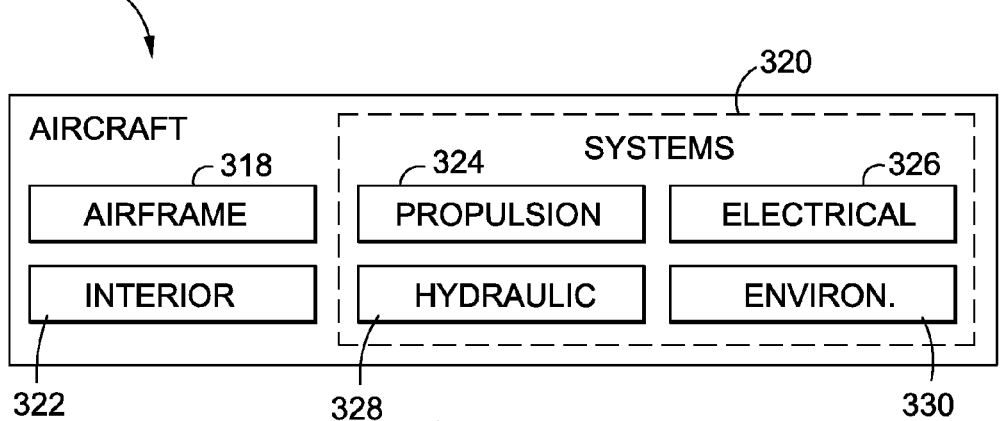
FIG. 21 is a block diagram of an aircraft.

Referring to FIG. 13, shown is perspective illustration of an aircraft 120 which may incorporate one or more composite structure 104 formed using the electromagnetic press 12 in various embodiments as disclosed herein. As can be seen in FIG. 13, the aircraft 120 may comprise a fuselage 122 having a pair of wings 124 and having a tail section 128 which may include a vertical stabilizer 132 and horizontal stabilizers 130. The aircraft 120 may further include control surfaces 126 and propulsion units 134. The aircraft 120 as shown in FIG. 13 is generally representative of a variety of vehicles which may incorporate a composite structure 104 formed with the electromagnetic press 12 as described herein. For example, the fuselage 122 may be formed from a composite layup 106 configured as the barrel section 86 illustrated in FIGS. 11-12 and formed using the electromagnetic press 12 as also illustrated therein. Likewise, a portion of a airframe 318 as shown in FIG. 21 or a wing 124, control surface 126, and/or tail section 128 as shown in FIG. 13 may advantageously be formed using one or more of the various embodiments of the electromagnetic press 12 as disclosed herein. However, the electromagnetic press 12 may be used to form composite structures 104 that may comprise a portion of any system, subsystem, assembly, application, structure or vehicle.

Figure 14:
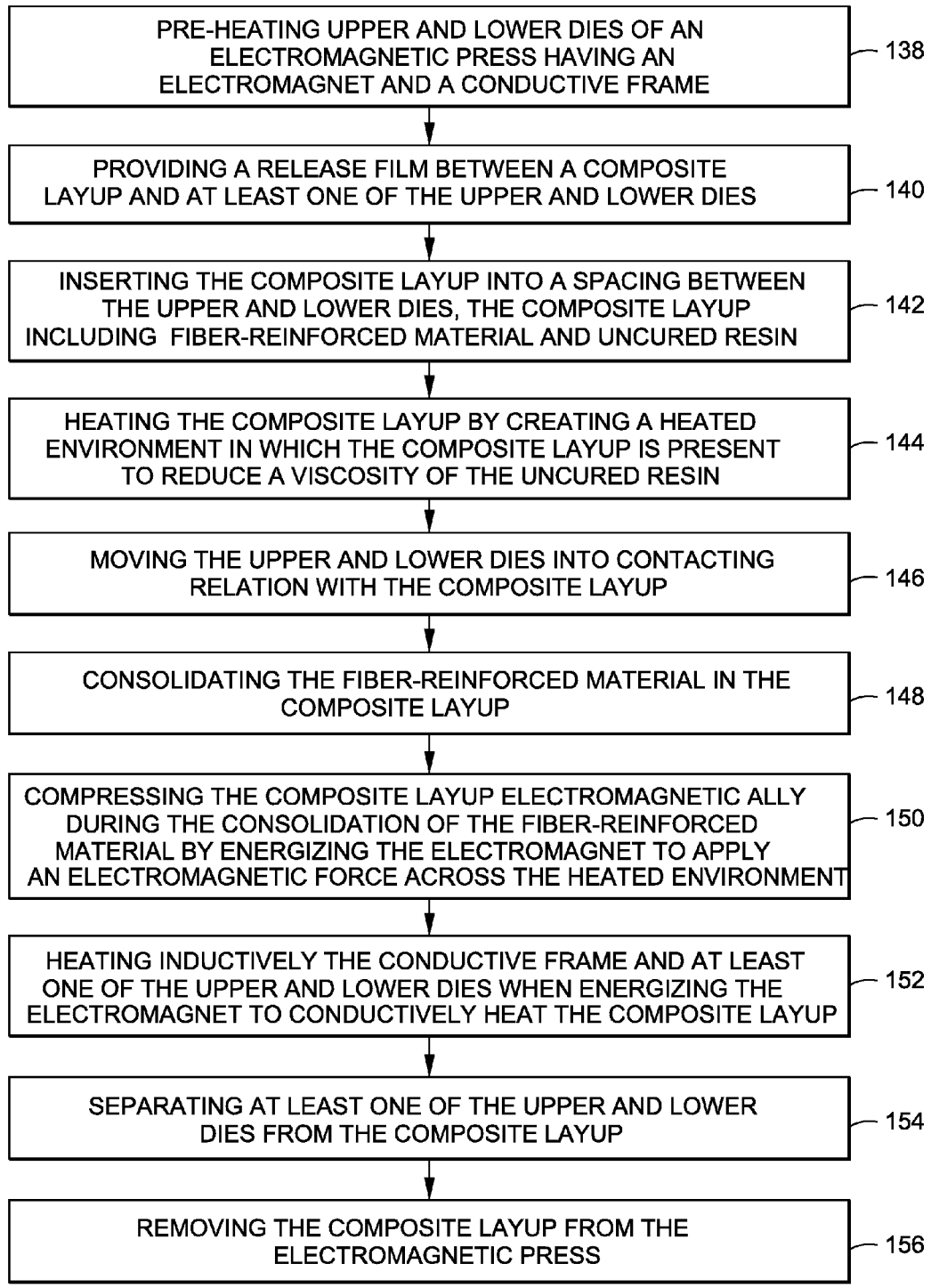
FIG. 14 is a flow diagram illustrating a methodology of fabricating the composite structure from the composite layup using the electromagnetic press.

Referring now to FIG. 14 and with additional reference to FIGS. 2-3, shown is a flow diagram illustrating a methodology of fabricating the composite structure 104 from the composite layup 106 using the electromagnetic press 12. In the methodology, step 138 may comprise pre-heating the upper and lower dies 26, 24 of the electromagnetic press 12 in anticipation of receiving the composite layup 106. Alternatively, one of the upper and lower dies 26, 24 may be configured as the pressure membrane 48 which may be adapted for producing configurations of the composite structure 104 where precise control of the contour on one of the opposing sides of the composite structure 104 may not be required as described above. The upper and/or lower dies 26, 24 and/or pressure membrane 48 may be heated by the heating mechanism 70 which may comprise the heating elements 72 shown in FIGS. 2 and 3 and/or as passages for circulating heating fluid or by any other suitable means as described above. Step 140 may comprise providing a release film 40 between the composite layup and one or both of the upper and lower dies 26, 24. The release film 40 may facilitate separation of the composite layup 106 from the lower mold surface 32, upper mold surface 30 and/or pressure membrane 48 such as after curing of the composite layup 106.

Step 142 may comprise inserting the composite layup 106 into the spacing 28 between the upper and lower dies 26, 24. The composite layup 106 may be provided as a pre-formed composite layup 106 comprised of any suitable material including, but not limited to, fiber-reinforced material 109 and uncured resin 110. However, the composite layup 106 may be comprised as any one of a variety of different material systems as described above. Step 144 may comprise applying heat to the composite layup 106 by creating the heated environment 73 within which the composite layup 106 may be present. The heated environment 73 may increase the temperature of the uncured resin 110 and facilitate a reduction in the viscosity of the uncured resin 110 to promote flow within the composite layup 106. Heat may be applied to the composite layup 106 such as by conductive heat transfer from the pre-heated upper and lower dies 26, 24 to increase the temperature of the composite layup 106. However, heat may also be applied to the composite layup 106 by inductive, radiative or convective heating.

Step 146 may comprise moving the upper and lower dies 26, 24 into contacting relation with the composite layup 106. For example, the actuation mechanism 22 shown in FIGS. 2-3 may be activated to lower the movable tool 16 until the upper die 26 contacts the composite layup 106. Step 148 may comprise electromagnetically consolidating the fiber-reinforced material 109 in the composite layup 106. Consolidation of the composite layup 106 may be effectuated in step 150 by energizing the electromagnet 42 such that compressive force is applied to the composite layup 106 between the upper and lower dies 26, 24. The electromagnet 42 may be energized by applying electrical current thereto such that the electromagnetic force Fe is applied across the heated environment 73. The electromagnetic force Fe may cause the upper die 26 and lower die 24 to compress the composite layup 106 during the curing process. The methodology may further comprise varying the amount of electrical current that may be applied to the electromagnet 42 to vary the amount of compressive force that is applied to the composite layup 106.

Heat may also be applied to the composite layup 106 during consolidation and curing of the composite layup 106. For example, heat may be applied to one or both of the upper or lower die 26, 24 using the heating mechanism 70 comprising the heating element 72. As indicated above, the heating element 72 may be configured in any one of a variety of embodiments. Heat may also be applied by inductive heating of the upper or lower dies 26, 24 as a result of energizing the electromagnet 42. For example, step 152 may comprise inductive heating of the conductive frame 46 and at least one of the upper and lower dies 26, 24 when energizing the electromagnet 42. Such inductive heating may occur during the application of electrical current to the magnetic coil 44 which may result in the coil current flow 66 circulating through the magnetic coil 44 and the inductive current flow 68 circulating through the conductive frame 46 and upper die 26 in a direction opposite the coil current flow 66. The resulting inductively-heated upper die 26 may conductively heat the composite layup 106.

The methodology illustrated in FIG. 14 may further comprise varying a temperature of the composite layup 106 over time. For example, the temperature of the composite layup 106 may be increased from an initial temperature $T_i$ (e.g., ambient) to a first temperature $T_1$. The first temperature $T_1$ may be maintained in the composite layup 106 over a first time period $t_1$ as illustrated in FIG. 10B. For example, the first temperature may facilitate a reduction in the viscosity of the uncured resin 110 to promote flow within the composite layup 106. The temperature of the composite layup 106 may be reduced from the first temperature $T_1$ to the second temperature $T_2$ which may be maintained in the composite layup 106 over a second time period $t_2$. The temperature of the composite layup 106 may be further reduced from the second temperature $T_2$ to the third temperature $T_3$. The third temperature $T_3$ may be maintained in the composite layup 106 over the third time period $t_3$ as shown in FIG. 10B. Subsequent increases and decreases in temperature are contemplated and are not limited to the above-described temperature profiles. The temperature of the composite layup 106 may be reduced from the third temperature $T_3$ to the initial temperature $T_i$ after cure has occurred. Step 154 may comprise separating the upper and lower dies 26, 24 from the composite layup 106 by activating the actuation mechanisms 22 to move the movable tool 16 away from the stationary tool 14. The release film 40 may be removed. Step 156 may comprise removing the composite layup 106 from the spacing 28 between the upper and lower dies 26, 24 of the electromagnetic press 12.

Figure 15:
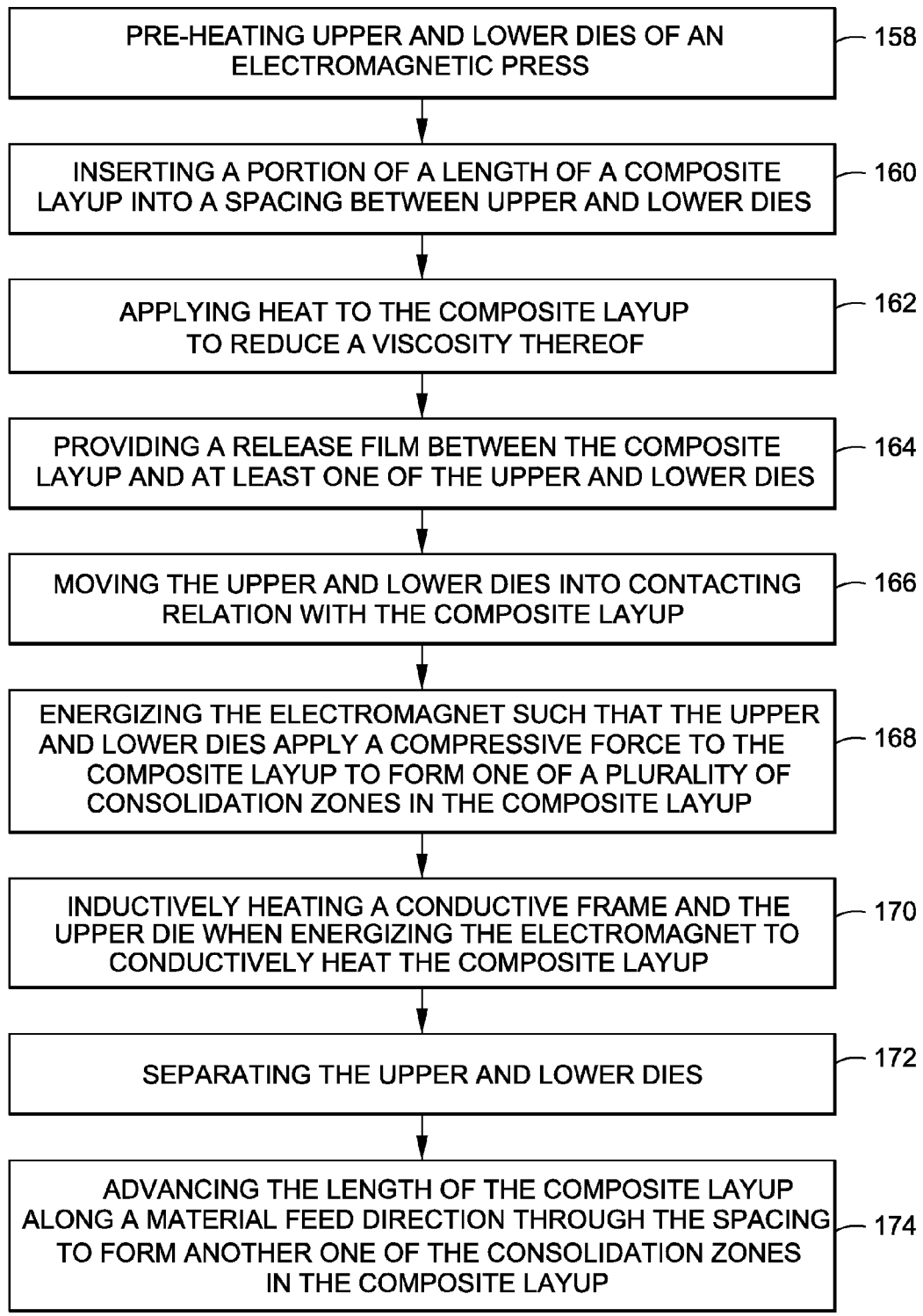
FIG. 15 is a flow diagram illustrating a methodology of forming a plurality of consolidation zones along a length of the composite layup using an embodiment of the electromagnetic press.

Referring to FIG. 15 and with additional reference to FIG. 4, shown is a flow diagram illustrating a methodology of forming a plurality of consolidation zones 84 along a length of the composite layup 106 using an embodiment of the electromagnetic press 12. As indicated above, an embodiment of the electromagnetic press 12 may be configured for continuous forming of composite structures 104 from a length of the composite layup 106. In the methodology, step 158 may comprise pre-heating the upper and lower dies 26, 24 of the electromagnetic press 12 in anticipation of receiving the composite layup 106 in a manner as described above with regard to the methodology illustrated in FIG. 14. For example, heating of the upper and lower dies 26, 24 may create the heated environment 73 within which the composite layup 106 may be present and which may facilitate the reduction in the viscosity of the uncured resin 110 in the composite layup 106.

In FIG. 15, step 160 may comprise inserting a portion of the length of the composite layup 106 into the spacing 28 between the upper and lower dies 26, 24. Heat may be applied to the upper and/or lower dies 26, 24 in step 162 in anticipation of receiving the composite layup 106 between the upper and lower dies 26, 24. In this regard, heat may be applied by conductive heat transfer from one or both of the upper and lower dies 26, 24 or by any other means including inductive, convective and/or radiative heating of the composite layup 106 in order to reduce the viscosity of uncured resin 110 in the composite layup. In step 164, one or more release films 40 may also be inserted between the composite layup 106 and the upper die 26 and/or between the composite layup 106 and the lower die 24. The release film 40 as shown in FIG. 4 may extend along the length of the composite layup 106 or may be provided as separate portions sized complementary to the dimensions of the upper and/or lower dies 26, 24. Step 166 may comprise moving the upper and lower dies 26, 24 into contacting relation with the composite layup 106 such by activating the actuation mechanism 22 to move the movable tool 16 downwardly toward the stationary tool 14.

Step 168 of the methodology may comprise energizing the electromagnet 42 such that the upper and lower dies 26, 24 apply a compressive force to the composite layup 106. The application of compressive force to the composite layup 106 may facilitate bleeding out of excess resin in the composite layup 106 and/or to consolidate the composite layup 106. The application of compressive force may result in the formation of one of the consolidation zones 84 in the composite layup 106 as illustrated in FIG. 4 wherein the consolidation zone 84 is illustrated as having a reduced thickness relative to the thickness of the unconsolidated or uncured composite layup 106. The temperature of the composite layup 106 may be increased or decreased depending upon the consolidation and cure requirements. For example, in step 170, heat may be applied to the composite layup 106 by inductive heating of the conductive frame 46 and upper die 26 illustrated in FIGS. 2-4. Such inductive heating may be effective to conductively heat the composite layup 106. Step 172 may comprise separating the upper and lower dies 26, 24 such that the composite structure 104 may be removed from the electromagnetic press 12. In this regard, the consolidation zone 84 may represent a cured composite structure 104. Step 174 may comprise advancing the length of the composite layup 106 such as in an incremental manner along a material feed direction 102 through the spacing 28 to form another one of the consolidation zones 84 in the composite layup 106 as shown in FIG. 4.

Figure 16:
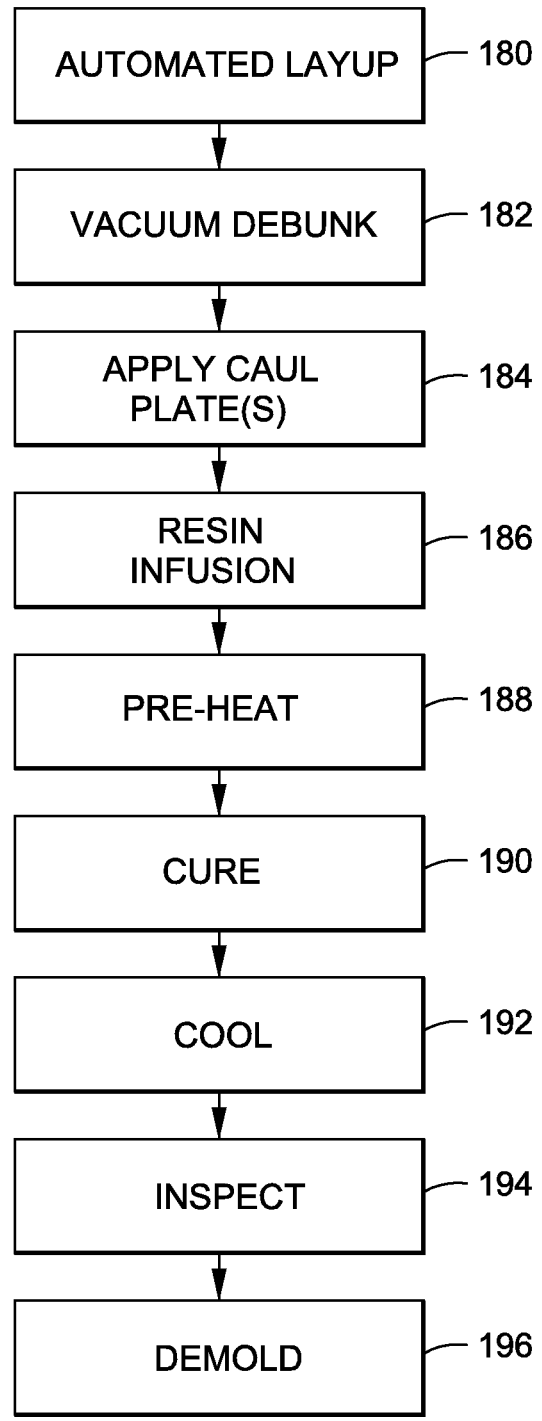
FIG. 16 is a flow diagram illustrating a methodology of fabricating a composite layup to form a composite structure using the electromagnetic press movable along the composite layup.

Referring to FIG. 16 and with additional reference to FIGS. 11-12, shown is a flow diagram illustrating a methodology by which a composite structure 104 may be formed using an embodiment of an electromagnetic press 12 as shown in FIGS. 11-12. The methodology may include step 180 comprising automated layup of the composite layup 106 such as by using any one of a variety of automated layup systems (not shown) such as an automated tape laying machine as known in the art. However, hand layup may also be used to form the composite layup 106. The methodology may include step 182 comprising vacuum debulking of the composite layup 106 to reduce a thickness of the composite layup 106. As shown in FIG. 7, the pre-heating portion 90 may facilitate heating of the composite layup 106 prior to optional application of caul plates (not shown) that may be applied to the composite layup 106 in step 184 to form the outer surface 114 of the composite layup 106. As indicated above, the composite layup 106 may be formed of any one of a variety of suitable liquid molding systems. For example, a resin infusion system may be used wherein uncured resin 110 may be drawn or infused into the composite layup 106 in step 186 using vacuum force applied to vacuum bags (not shown) covering the composite layup 106.

Step 188 may comprise pre-heating the composite layup 106 using the electromagnetic press 12 mounted to the composite layup 106. For example, in FIG. 7, the electromagnetic press 12 may be mounted to a lower portion of the composite layup 106 with the inner and outer dies 88, 89 having the composite layup 106 received therebetween. Pre-heating of the composite layup 106 may be facilitated using the pre-heating portion 90 of the electromagnetic press 12. In this regard, the pre-heating portion 90 may include the heating mechanisms 70 as described above which may be configured to apply heat to the pre-heat zone 91 such as to reduce the viscosity of the uncured resin 110 to promote bleeding of excess resin prior to or during the application of the compressive force.

In step 190, the curing portion 92 of the electromagnetic press 12 may comprise a plurality of electromagnets 42 which may be coupled to the plurality of outer dies 89 as illustrated in FIG. 7. Each one of the outer dies 89 may be movable relative to the inner die(s) 88 disposed on an opposing side of the composite layup 106. However, the electromagnetic press 12 may be configured such that the inner die 88 comprises a plurality of inner die arc segments 88a with each inner die arc segments 88a being separately movable relative to the outer die. Furthermore, each one of the inner dies may have at least one electromagnet 42 coupled thereto. Energization of the magnetic coil 44 may result in drawing the inner and outer dies 88, 89 toward one another for application of the compressive forces to the composite layup 106 as described above. The compressive forces may be applied with simultaneous application of heat during the curing step.

Step 192 may comprise quenching or cooling of the composite layup 106 in the cooling zone 95 using the cooling portion 94 of the electromagnetic press 12. The cooling portion 94 may comprise one or more of the cooling mechanisms 80 as described above and which may be included in one or more of the inner and/or outer dies 88, 89 or in supporting structure thereof. The cooling portion 94 may be operative to rapidly cool the composite layup 106 or to effect an incremental change in temperature of the composite layup 106 within the cooling zone 95 in order to reduce the duration of the curing cycle. Step 194 may comprise inspecting the composite layup 106 following consolidation and/or curing thereof. Inspection of the composite layup 106 may be facilitated with the use of the inspection portion 96 operating on the inspection zone 97 of the composite layup 106 as illustrated in FIG. 7. The inspection portion 96 may comprise any number of a variety of suitable composite inspection mechanisms known in the art. For example, the inspection portion 96 may facilitate detection of undesirable properties in the cured composite structure 104 using non-destructive testing (NDT) techniques including, without limitation, the use of ultrasonics and other techniques. Following inspection, the methodology may comprise a demolding step 196 wherein the electromagnetic press 12 may be removed from the composite layup 106. The above-described methodology may be performed sequentially while the electromagnetic press 12 is moved along the length of the composite layup 106.

Figure 17:
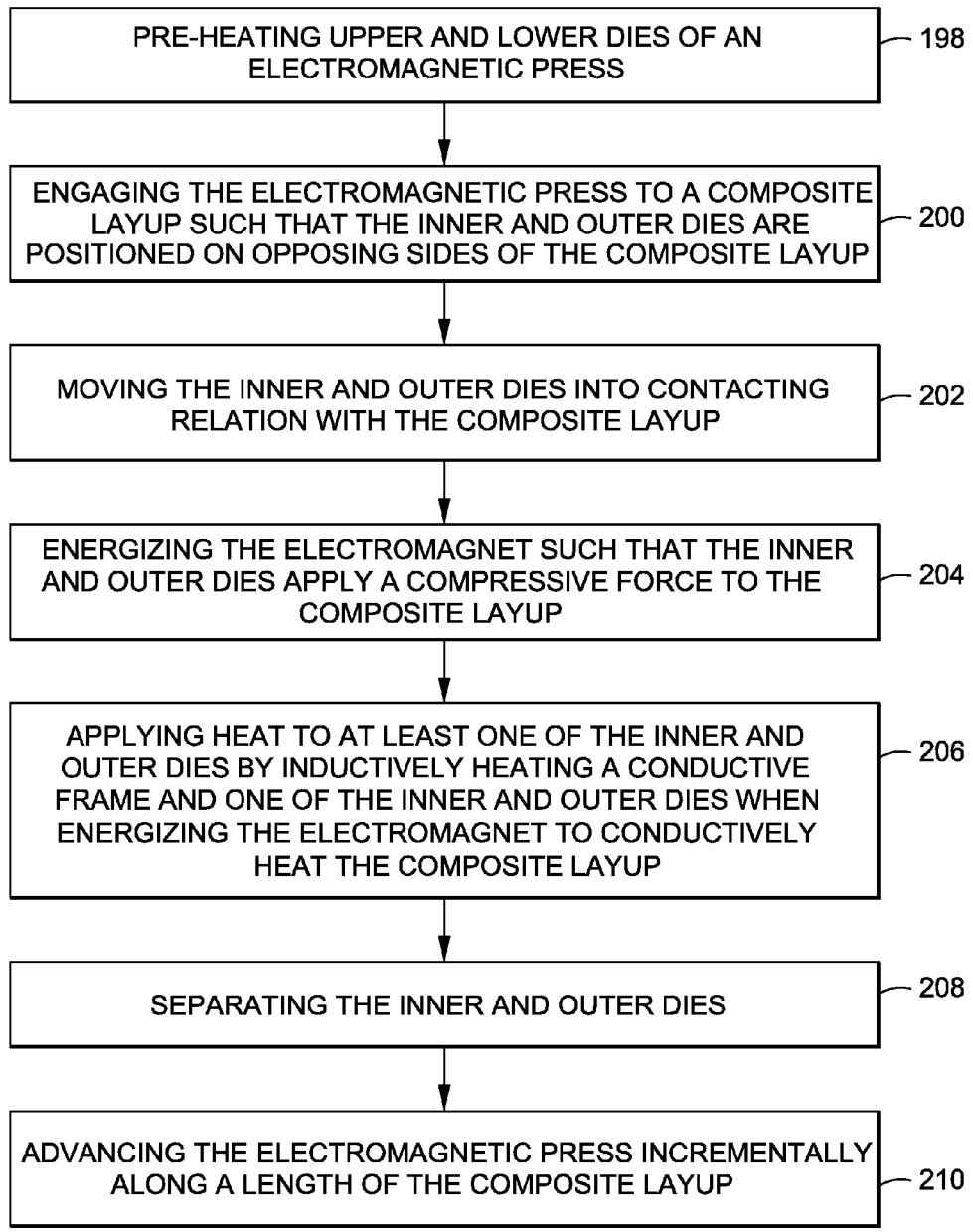
FIG. 17 is a flow diagram illustrating a methodology of fabricating a composite structure from a composite layup using an embodiment of the electromagnetic press.

Referring to FIG. 17 and with additional reference to FIGS. 11-12, shown is a flow diagram illustrating a methodology of fabricating a composite structure 104 from the composite layup 106. More particularly, FIG. 17 illustrates a methodology for consolidating and/or curing the composite layup 106 using an embodiment of the electromagnetic press 12 as shown in FIGS. 11-12. Step 198 may comprise pre-heating the inner and outer dies 12, 114 in anticipation of receiving the composite layup 106 therebetween. Step 200 of the methodology may comprise engaging the electromagnetic press 12 to the composite layup 106 such that the inner and outer dies 88, 89 are positioned on opposing sides of the composite layup 106 as illustrated in FIGS. 11-12. Each one of the outer dies 89 may be movable relative to the inner die(s) 88 for receiving the composite layup 106 therebetween. As indicated above, one or both of the inner and outer dies 88, 89 may be provided as inner dies arc segments 88a and outer dies arc segments 89a, respectively. Step 202 may comprise moving the inner and outer dies 88, 89 into contacting relation with the composite layup 106. The composite layup 106 may be pre-heated prior to applying compressive force to the composite layup 106 for improving resin flow. Step 204 may comprise energizing the electromagnet 42 such that the inner and outer dies 88, 89 apply the compressive force to the composite layup 106.

Step 206 may comprise applying heat to at least one of the inner and outer dies 26, 24 illustrated in FIGS. 11-12 by inductively heating the conductive frame 46 and the inner and outer die 88, 89 that is coupled to the conductive frame 46. Inductive heating may occur when the electromagnet 42 is energized as described above. The inductively-heated inner and outer dies 88, 89 may conductively heat the composite layup 106. Heat may also be applied to the composite layup 106 by conductive heating or in combination with or as an alternative to convective heating and/or radiative heating. The composite layup 106 may be heated prior to and/or during application of the compressive force. Step 208 of the methodology may comprise separating the inner and outer dies 88, 89 using the actuation mechanisms 22 such that the electromagnetic press 12 may be advanced along the length of the composite layup 106 in an incremental manner in step 210. For example, with reference to FIG. 11, the electromagnetic press 12 may be moved upwardly along the composite layup 106 such that the curing portion 92 of the electromagnetic press 12 is moved from the curing zone 93 to the pre-heating zone 91 previously occupied by the pre-heating portion 90 of the electromagnetic press 12. Likewise, the cooling and inspection portions 94, 96 may be moved in unison with the pre-heating and curing portions 90, 92 such that the cooling and inspection portions 94, 96 are moved to overlap respective ones of the curing and cooling zones 93, 95 previously occupied by respective ones of the curing and cooling portions 92, 94.

Figure 18:
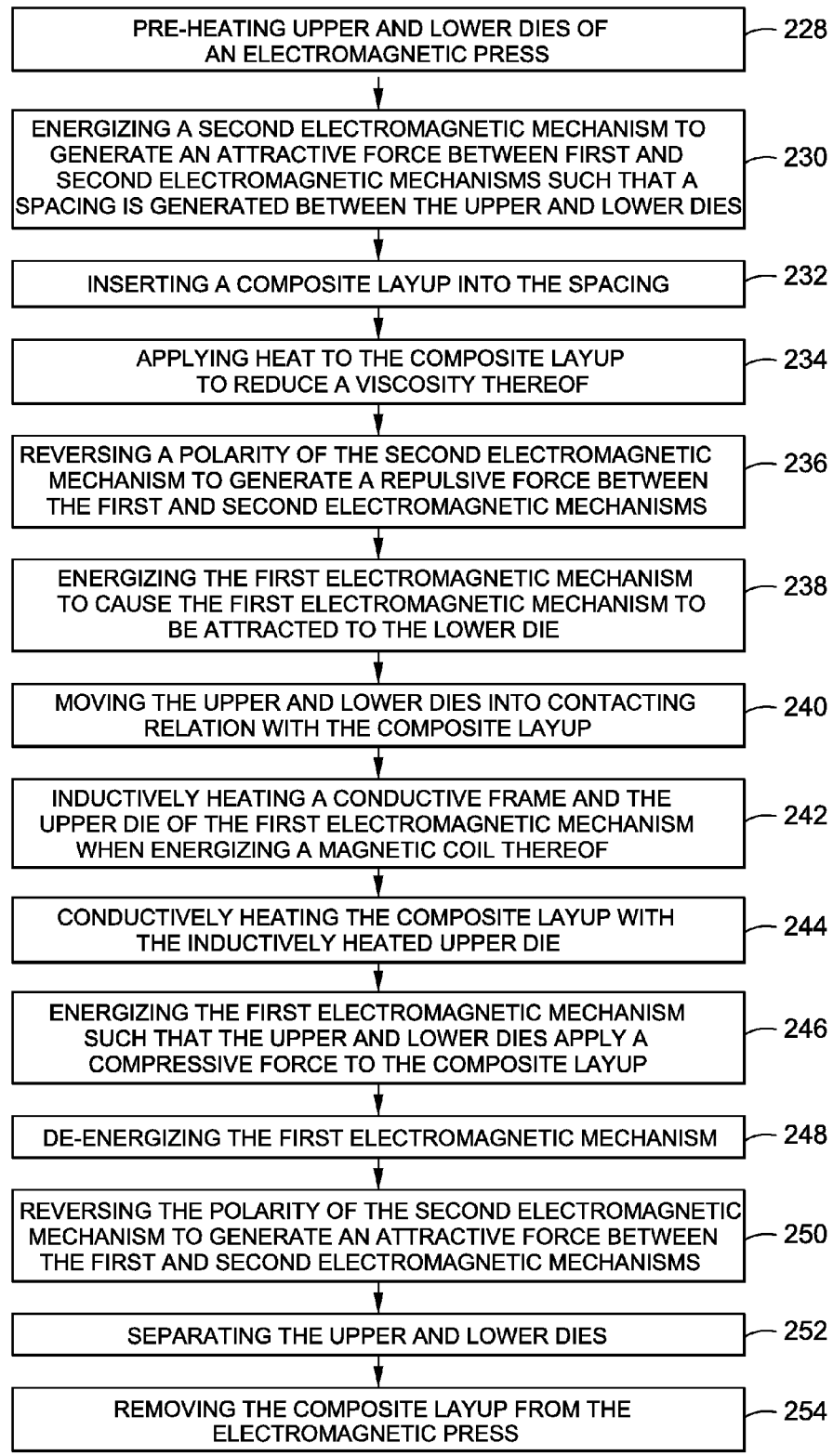
FIG. 18 is a flow diagram illustrating a methodology of fabricating a composite structure from a composite layup using an embodiment of the electromagnetic press having first and second electromagnetic mechanisms.

Referring to FIG. 18 and with additional reference to FIGS. 6-7, shown is a flow diagram illustrating a methodology of fabricating the composite structure 104 from the composite layup using an embodiment of the electromagnetic press 12 as illustrated in FIGS. 6-7. As described above, the electromagnetic press illustrated in FIGS. 6-7 includes first and second electromagnetic mechanisms 98, 99. The first electromagnetic mechanism 98 has the upper die 26 coupled thereto and mounted above the lower die 24 which may be fixedly supported on the stationary tool 14. The first electromagnetic mechanism 98 is movable in relation to the second electromagnetic mechanism 99 which is fixed in position above the first electromagnetic mechanism 98. The second electromagnetic mechanism 99 has reversible polarity such that the electromagnetic force Fe generated upon energization of the second electromagnetic mechanism 99 may be alternately produced as an attractive force Fa or as a repulsive force Fr between the first and second electromagnetic mechanisms 98, 99. The first electromagnetic mechanism 98 may be energized to draw the upper and lower dies 26, 24 together such that the compressive force may be applied to the composite layup 106.

Referring still to FIG. 18, the methodology of fabricating the composite structure 104 from the composite layup may include step 228 comprising pre-heating one or both of the upper and lower dies 26, 24 of the electromagnetic press 12 in anticipation of receiving the composite layup 106 in a manner as described above. Step 230 may comprise energizing the second electromagnetic mechanism 99 by applying a current to the electromagnet 42 in the second electromagnetic mechanism 99 to generate the attractive force Fa between the first and second electromagnetic mechanisms 98, 99 as illustrated in FIG. 6. In this manner, the spacing 28 is generated between the upper and lower dies 26, 24 such that the composite layup 106 may be inserted into the spacing 28 in step 232. Step 234 may comprise applying heat to the composite layup 106 such as by conductive heat transfer from one or both of the pre-heated upper and lower dies 26, 24 or by using alternative heating mechanisms 70.

Referring to FIG. 18, step 236 may comprise reversing the polarity of the second electromagnetic mechanism 99 such that the repulsive force Fr is generated between the first and second electromagnetic mechanisms 98, 99 as illustrated in FIG. 7. By generating the repulsive force Fr, the first electromagnetic mechanism 98 is repelled from the second electromagnetic mechanism 99. Step 238 may comprise energizing the first electromagnetic mechanism 98 to cause the first electromagnetic mechanism 98 to be attracted to the lower die 24 and/or stationary tool 14 such that the upper and lower dies 26, 24 may be moved into contacting relation with the composite layup 106 in step 240. As a means to apply heat to the composite layup 106 when in contact with the upper and lower dies 26, 24, step 242 may comprise inductively heating the conductive frame 46 and the upper die 26 and resulting in conductive heating of the composite layup 106 in step 244. The compressive force is applied to the composite layup 106 upon continued energization of the magnetic coil 44 of the first electromagnetic mechanism 98 in step 246. The application of electrical current to the magnetic coil 44 and the resulting coil current flow 66 through the magnetic coil 44 causes an inductive current flow 68 through the conductive frame 46 and upper die 26 in a direction opposite the direction of the coil current flow 66 as illustrated in FIG. 7. The inductive current flow 68 may cause inductive heating of the conductive frame 46 and the upper die 26. Step 244 may comprise conductively heating the composite layup with at least one of the conductively heated upper and lower dies 26, 24.

Upon application of compressive force and/or heat to the composite layup 106 for a predetermined period of time, the methodology may comprise de-energizing the first electromagnetic mechanism 98 in step 248 and reversing the polarity of the second electromagnetic mechanism 99 in step 250 by applying electrical current to the magnetic coil 44 in a direction that is opposite to the direction of the electrical current as applied in step 230. The electromagnetic force Fe generated under reverse polarity of the second electromagnetic mechanism 99 may be an attractive force Fa between the first and second electromagnetic mechanisms 98, 99 and drawing the second electromagnetic mechanism 99 upwardly such that the upper and lower dies 26, 24 are separated in step 252. The composite layup 106 or composite structure 104 may then be removed from the electromagnetic press 12 in step 254 and the process may be repeated by inserting an uncured composite layup 106 into the electromagnetic press 12.

Figure 19:
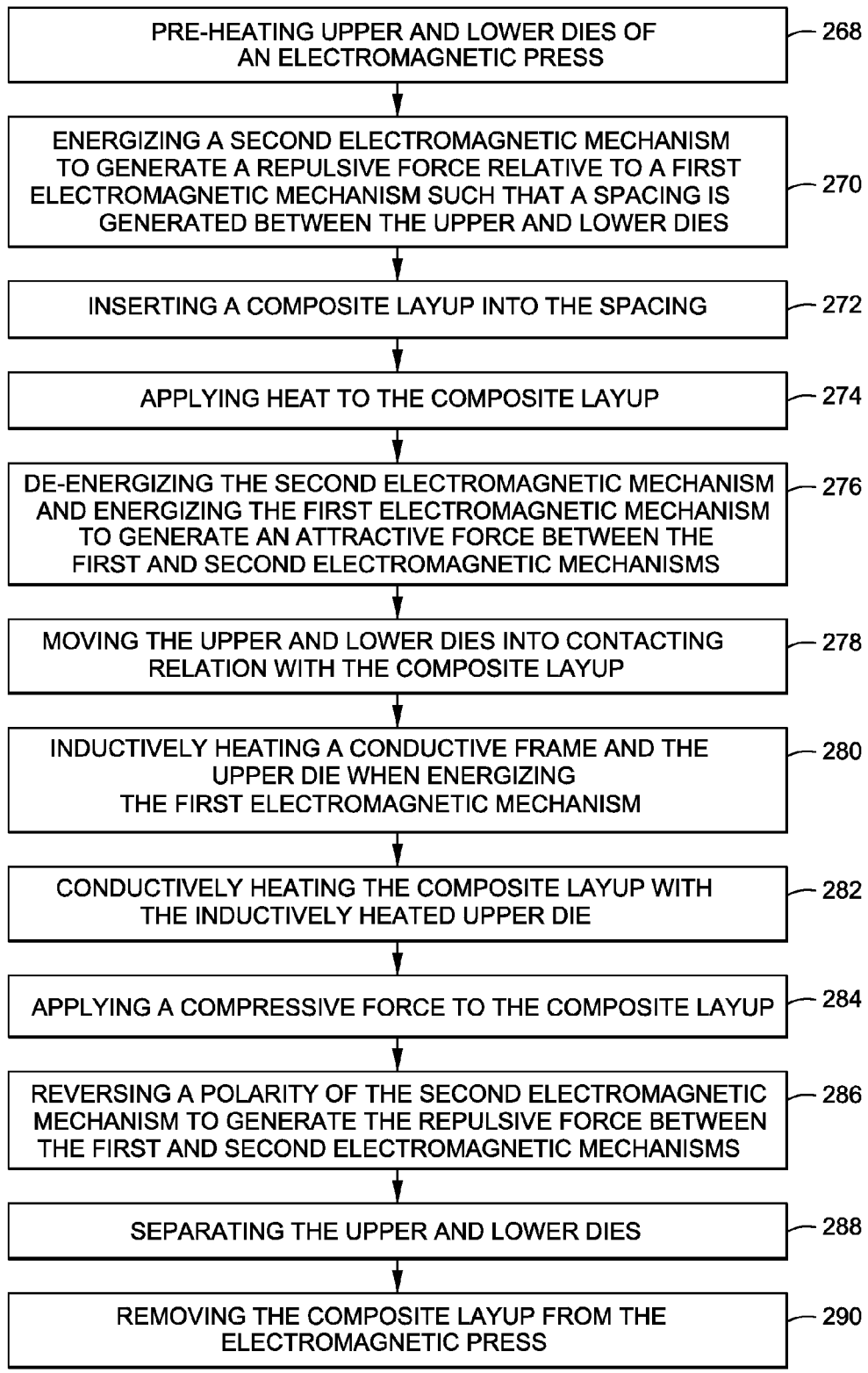
FIG. 19 is a flow diagram illustrating a methodology of fabricating a composite structure from a composite layup using an embodiment of the electromagnetic press having upper and lower dies respectively coupled to first and second electromagnetic mechanisms.

Referring to FIG. 19 and with additional reference to FIGS. 8-9, shown is a flow diagram illustrating a methodology of fabricating the composite structure 104 from the composite layup 106 using the embodiment of the electromagnetic press 12 as illustrated in FIGS. 8-9. The electromagnetic press 12 illustrated in FIGS. 8-9 includes first and second electromagnetic mechanisms 98, 99 wherein the first electromagnetic mechanism 98 may be movable in relation to the second electromagnetic mechanism 99 which may be fixed in position. More specifically, the first electromagnetic mechanism 98 may be movable between the positions shown in FIGS. 8-9. The methodology illustrated in the flow diagram of FIG. 19 may include a pre-heating step 268 similar to that which is described above with reference to the methodology illustrated in FIG. 18.

Step 270 may comprise energizing the second electromagnetic mechanism 99 which may be configured with reversible polarity. Energization of the second electromagnetic mechanism 99 may generate a repulsive force Fr relative to the first electromagnetic mechanism 98 such that the spacing 28 is generated between the upper and lower dies 26, 24 as shown in FIG. 8. Step 272 may comprise inserting the composite layup 106 into the spacing 28 between the upper and lower dies 26, 24 and applying heat to the composite layup 106 in step 274 by any suitable means including, but not limited to, inductive, conductive, convective and radiative heating.

Referring still to FIG. 19 with additional reference to FIGS. 8-9, step 276 may comprise de-energizing the second electromagnetic mechanism 99 such as by withdrawing the application of electrical current to the electromagnet 42 of the second electromagnetic mechanism 99. The first electromagnetic mechanism 98 may then be energized in order to generate the attractive force Fa between the first and second electromagnetic mechanisms 98, 99. As a result of the attractive force Fa, step 278 may comprise moving the upper and lower dies 26, 24 into contacting relation with the composite layup 106. The conductive frame 46 and the upper die 26 may be inductively heated in step 280 as a result of energization of the first electromagnetic mechanism 98. The inductive heating of the upper die 26 may facilitate conductive heating of the composite layup 106 in step 282. In this same regard, energization of the second electromagnetic mechanism 99 in steps 270 may result in inductive heating of the conductive frame 46 and the lower die 24 surrounding the electromagnet 42 of the second electromagnetic mechanism 99. Such heating may facilitate heating the composite layup 106 in step 274 which may reduce the viscosity of the uncured resin 110 and promote the flow thereof through the fiber-reinforced material 109 of the composite layup 106.

Step 284 may comprise applying the compressive force to the composite layup 106 as a result of the attractive force Fa generated between the first and second electromagnetic mechanisms 98, 99. The compressive force may be varied over time by varying a magnitude of the electrical current that may be applied to the electromagnet 42 of the first electromagnetic mechanism 98. Step 286 of the methodology may comprise reversing the polarity of the second electromagnetic mechanism 99 to generate a repulsive force Fr between the first and second electromagnetic mechanisms 98, 99 in order to separate the upper and lower dies 26, 24 in step 288. The composite layup 106 or resulting composite structure 104 may be removed from the electromagnetic press 12 in step 290 and the process may be repeated.

Figure 20:
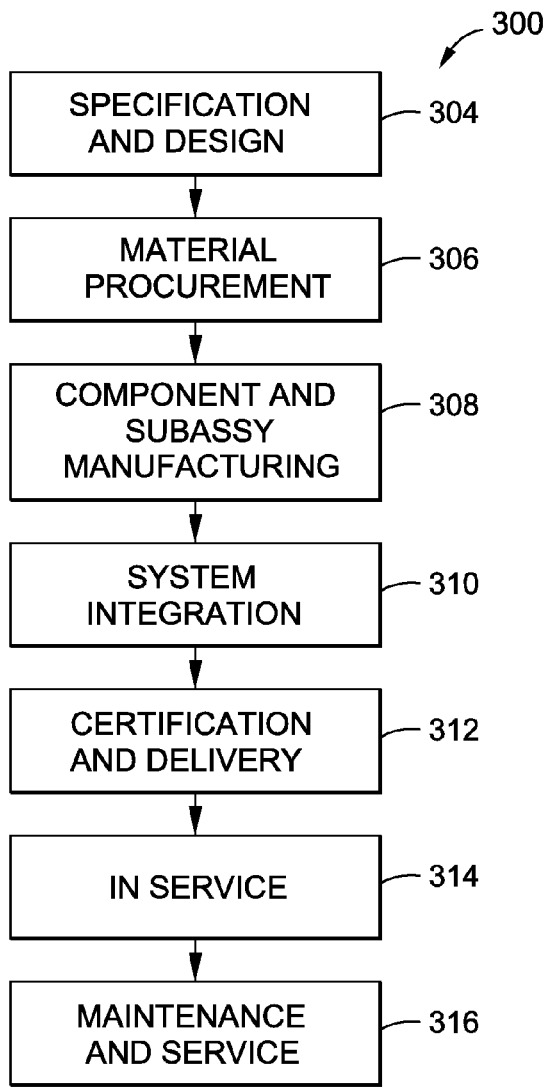
FIG. 20 is a flow diagram of an aircraft production and service methodology.

Referring to FIGS. 20-21, embodiments of the disclosure may be described in the context of an aircraft manufacturing and service method 300 as shown in FIG. 20 and an aircraft 302 as shown in FIG. 21. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 21, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service, for example and without limitation, to maintenance and service 316.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for forming a composite structure, comprising:
   an electromagnetic press, including:
   an upper die;
   a lower die mounted in spaced relation to the upper die for receiving a composite layup; and
   at least one electromagnet including a magnetic coil and a conductive frame at least partially surrounding the magnetic coil, the electromagnet being energizable such that the upper and lower dies apply a compressive force to the composite layup; and
   at least one of the upper and lower dies being coupled to the conductive frame such that energization of the magnetic coil causes inductive heating of at least one of the upper and lower dies.

2. The system of claim 1 wherein:
the electromagnet comprises a plurality of magnetic coils for applying the compressive force to the composite layup.

3. The system of claim 2 wherein:
the magnetic coils comprise a first coil and a second coil for applying corresponding first and second compressive forces to corresponding first and second areas of the composite layup.

4. The system of claim 1 wherein:
the heating mechanism includes a first heating zone for heating a portion of the composite layup to a first temperature and a second heating zone for heating a portion of the composite layup to a second temperature.

5. The system of claim 1 further comprising:
at least one cooling mechanism mounted to the electromagnetic press for cooling at least one of the upper and lower dies.

6. The system of claim 1 further comprising:
a stationary magnetic member fixedly mounted in spaced relation to the lower die and having the electromagnet mounted thereto; and
a movable magnetic member coupled to the upper die and being mounted on a side of the stationary magnetic member opposite the upper die, the movable magnetic member being drawn toward the stationary magnetic member upon energization of the electromagnet to cause the upper and lower dies to apply the compressive force to the composite layup.

7. A system for forming a composite structure from a composite layup, comprising:
an electromagnetic press, including:
an upper die;
a lower die mounted in spaced relation to the upper die for receiving the composite layup, the upper and lower dies being movable into contacting relation with the composite layup; and
at least one electromagnet having a magnetic coil, the electromagnet being coupled to one of the upper and lower dies and being energizable by applying an electric current to the magnetic coil such that the upper and lower dies apply a compressive force to the composite layup; and
a heating mechanism configured to apply heat to the composite layup, the heating mechanism comprising the magnetic coil and a conductive frame at least partially surrounding the magnetic coil, the conductive frame being coupled to one of the upper and lower dies and being configured such that energization of the magnetic coil causes inductive heating of one of the upper and lower dies for conductively heating the composite layup.

8. A system for forming a composite structure, comprising:
an electromagnetic press, including:
an upper die having a first electromagnetic mechanism coupled thereto;
a lower die mounted in spaced relation to the upper die;
a second electromagnetic mechanism mounted on a side of the first electromagnetic mechanism opposite the lower die and being energizable to generate an attractive force relative to the first electromagnetic mechanism such that a composite layup is receivable between the upper and lower dies, the second electromagnetic mechanism having reversible polarity such that a repulsive force is generated relative to the first electromagnetic mechanism, the first electromagnetic mechanism being energizable to cause the upper and lower dies to apply a compressive force to the composite layup; and
the first electromagnetic mechanism includes a magnetic coil and a conductive frame at least partially surrounding the magnetic coil such that energization of the magnetic coil causes inductive heating of the upper die.

9. The system of claim 8 wherein:
the first electromagnetic mechanism is configured to be de-energized when the second electromagnetic mechanism is energized.

10. The system of claim 8 further comprising:
at least one of a heating mechanism and a cooling mechanism mounted to the electromagnetic press for respectively heating and cooling at least one of the upper and lower dies.

11. A system for forming a composite structure, comprising:
an electromagnetic press, including:
an upper die having a first electromagnet mechanism coupled thereto;
a lower die mounted in spaced relation to the upper die and having a second electromagnetic mechanism coupled thereto, the second electromagnetic mechanism being energizable to generate a repulsive force relative to the first electromagnetic mechanism such that a composite layup is receivable between the first and second dies, the second electromagnetic mechanism being de-energizable when the first electromagnetic mechanism is energized to cause the first electromagnetic mechanism to generate an attractive force relative to the second electromagnetic mechanism such that the upper and lower dies apply a compressive force to the composite layup;
at least one of the first and second electromagnetic mechanisms includes a magnetic coil and a conductive frame at least partially surrounding the magnetic coil; and
at least one of the upper and lower dies being coupled to the conductive frame such that energization of the magnetic coil causes inductive heating of at least one of the upper and lower dies.

12. The system of claim 11 further comprising:
at least one of a heating mechanism and a cooling mechanism mounted to the electromagnetic press for respectively heating and cooling at least one of the upper and lower dies.

13. A system for fabricating a composite structure, comprising:
an electromagnetic press, including:
an inner die;
an outer die mountable in spaced relation to the inner die for receiving a composite layup;
an electromagnet coupled to one of the inner and outer dies and being energizable such that the inner and outer dies apply a compressive force to the composite layup, the electromagnetic press being movable along a length of the composite layup, the electromagnet includes a magnetic coil and a conductive frame at least partially surrounding the magnetic coil; and
at least one of the inner and outer dies being coupled to the conductive frame such that energization of the magnetic coil causes inductive heating of the conductive frame and the one of the inner and outer dies coupled thereto.

14. The system of claim 13 wherein:
the composite layup is configured as a barrel section having inner and outer surfaces;
at least one of the inner and outer dies is configured complementary to a corresponding one of the inner and outer surfaces.

15. The system of claim 13 further comprising at least one of the following:
a pre-heating portion, a curing portion, a cooling portion, an inspection portion.

* * * * *